US009205349B2

(12) United States Patent
Kaminski et al.

(10) Patent No.: US 9,205,349 B2
(45) Date of Patent: Dec. 8, 2015

(54) METHOD AND APPARATUS FOR HEATING DURING A LIQUID PURIFICATION PROCESS USING AN ELECTROMAGNETIC HEATER

(71) Applicants: Joseph W. Kaminski, Campell, CA (US); Charles J. Borg, San Francisco, CA (US); Dariush Golpira, Westlake Village, CA (US)

(72) Inventors: Joseph W. Kaminski, Campell, CA (US); Charles J. Borg, San Francisco, CA (US); Dariush Golpira, Westlake Village, CA (US)

(73) Assignee: Waterpointe-Global LLC, San Francisco, CA (US)

( * ) Notice: Subject to any disclaimer, the term of this patent is extended or adjusted under 35 U.S.C. 154(b) by 99 days.

(21) Appl. No.: 13/894,301

(22) Filed: May 14, 2013

(65) Prior Publication Data
US 2014/0339071 A1   Nov. 20, 2014

Related U.S. Application Data

(63) Continuation-in-part of application No. 13/214,114, filed on Aug. 19, 2011.

(51) Int. Cl.
| | |
|---|---|
| *B01D 3/02* | (2006.01) |
| *C02F 1/04* | (2006.01) |
| *F22B 1/28* | (2006.01) |
| *H05B 6/10* | (2006.01) |
| *B01D 1/00* | (2006.01) |

(52) U.S. Cl.
CPC ............... *B01D 3/02* (2013.01); *B01D 1/0017* (2013.01); *B01D 1/0023* (2013.01); *C02F 1/043* (2013.01); *F22B 1/281* (2013.01); *H05B 6/108* (2013.01); *Y02W 10/37* (2015.05)

(58) Field of Classification Search
CPC ........ B01D 1/0023; B01D 1/043; B01D 3/02; C02F 1/043; F22B 1/281; H05B 6/108
USPC .............................................. 202/166; 203/10
See application file for complete search history.

(56) References Cited

U.S. PATENT DOCUMENTS

| | | | | | |
|---|---|---|---|---|---|
| 4,167,454 | A | * | 9/1979 | Feres | 202/236 |
| 4,341,936 | A | * | 7/1982 | Virgin | 219/630 |
| 5,075,097 | A | * | 12/1991 | Cameron | 423/522 |
| 5,773,797 | A | * | 6/1998 | Uemura | 219/628 |

(Continued)

OTHER PUBLICATIONS

Rev. D, "AN9012: Induction Heating System Topology Review", Jul. 2000, Fairchild Semiconductor.

(Continued)

*Primary Examiner* — In Suk Bullock
*Assistant Examiner* — Jonathan Miller
(74) *Attorney, Agent, or Firm* — James M. Wu; JW Law Group

(57) ABSTRACT

A liquid processing system is able to purify liquid such as water using an electromagnetic heater. The system, in one embodiment, includes a main boiler, a bottom boiler, a heating element, and a heating coil. The main boiler is structured to have a cylindrical shape and is configured to separate purified liquid from incoming liquid. The bottom boiler, configured to couple to the main boiler, holds at least a portion of incoming liquid for purification process. While the heating coil, which is situated adjacent to the heating element, is able to generate a magnetic field in accordance with an electrical current, the heating element produces heat needed for purification process in response to the magnetic field.

14 Claims, 27 Drawing Sheets

(56) References Cited

U.S. PATENT DOCUMENTS

| | | | | |
|---|---|---|---|---|
| 5,968,321 | A | * | 10/1999 | Sears .......................... 202/172 |
| 5,990,465 | A | * | 11/1999 | Nakaoka et al. .............. 219/629 |
| 6,297,483 | B2 | * | 10/2001 | Sadahira et al. ............. 219/629 |
| RE37,800 | E | * | 7/2002 | Uemura ........................ 219/628 |
| 6,906,296 | B2 | * | 6/2005 | Centanni et al. ............. 219/628 |
| 6,967,315 | B2 | * | 11/2005 | Centanni et al. ............. 219/628 |
| 8,945,350 | B2 | * | 2/2015 | Bratina et al. .................. 203/87 |
| 2010/0314383 | A1 | * | 12/2010 | Kollewe ........................ 219/600 |
| 2013/0043118 | A1 | * | 2/2013 | Kaminski et al. ............... 203/10 |
| 2013/0092681 | A1 | * | 4/2013 | Nangle ......................... 219/630 |
| 2013/0118714 | A1 | * | 5/2013 | Kaminski et al. ........ 165/104.19 |

OTHER PUBLICATIONS http://en.wikipedia.org/wiki/Induction_cooker. "Induction Cooker", Jul. 2010, Wikipedia.

* cited by examiner twelve flutes assembly

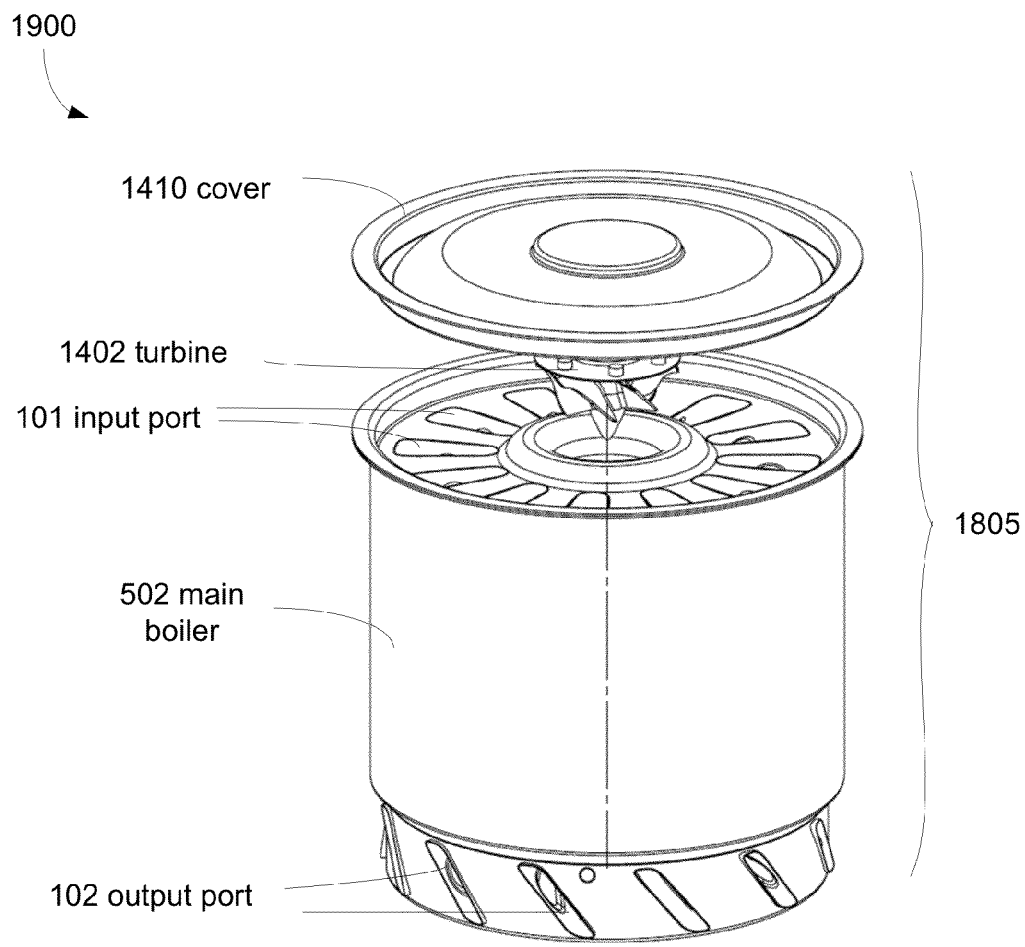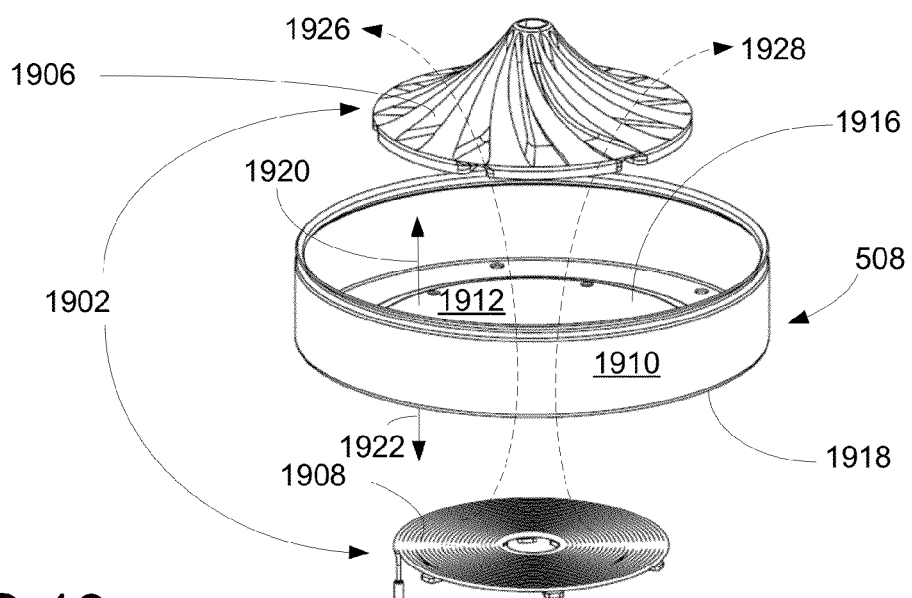
FIG 19

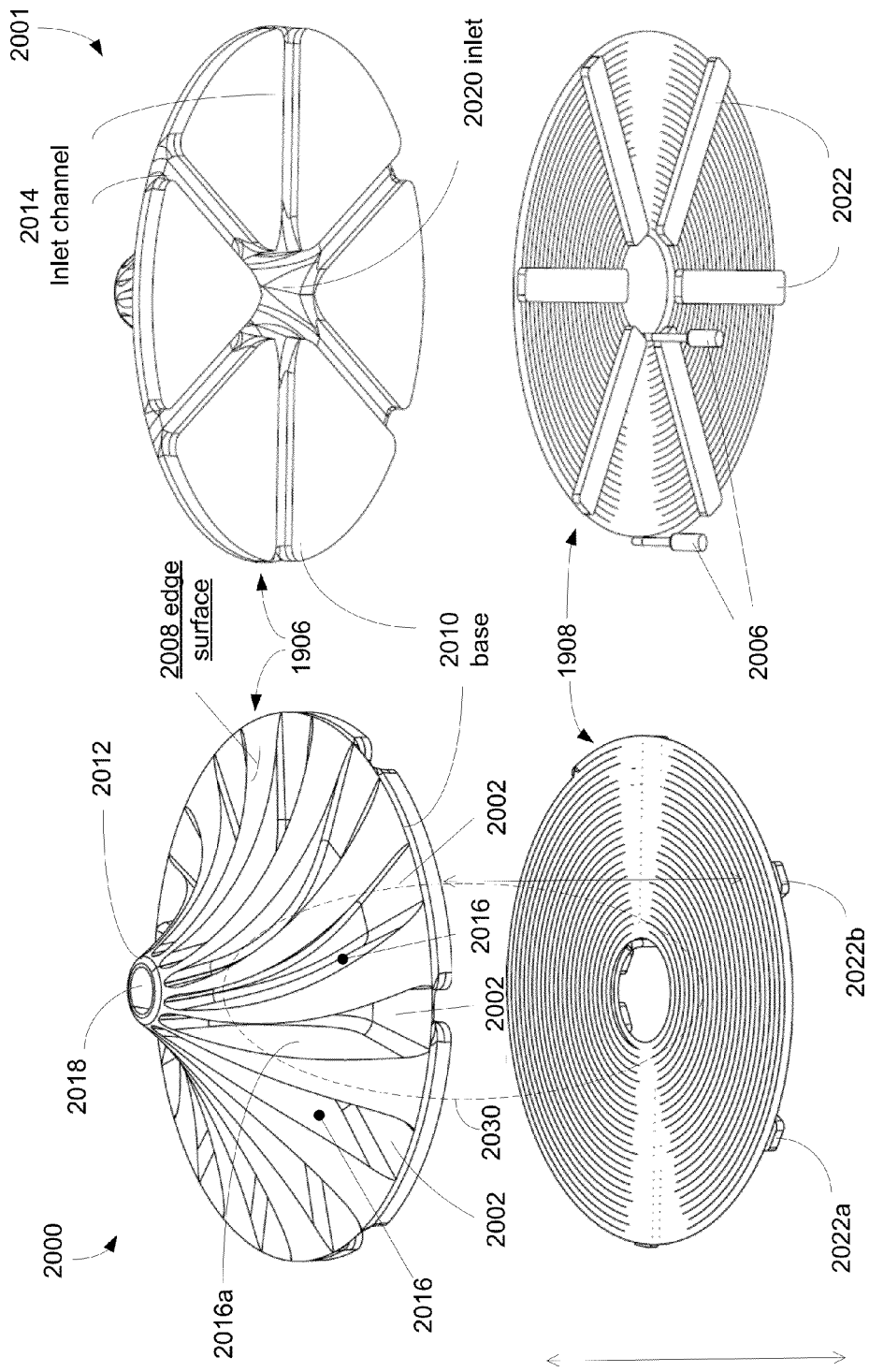

METHOD AND APPARATUS FOR HEATING DURING A LIQUID PURIFICATION PROCESS USING AN ELECTROMAGNETIC HEATER

PRIORITY

This patent application is a continuous-in-part (CIP) application of co-pending U.S. patent application Ser. No. 13/214,114, entitled "METHODS AND APPARATUS FOR PURIFYING LIQUID USING REGENERATING HEAT EXCHANGE," filed on Aug. 19, 2011, the disclosure of which is incorporated herein by reference.

FIELD

The exemplary embodiment(s) of the present invention relates to heat purification process. More specifically, the exemplary embodiment(s) of the present invention relates to liquid heating process.

BACKGROUND

Clean water is critical to all life forms including humans or animal on this planet. With enhanced technology and information technology in recent years, demand of consumable drinking water or high quality drinkable water is steadily increasing across the globe. For example, readily available clean drinkable water can reduce disease, epidemic, poverty, and/or conflict throughout the world. With increasing world population and finite amount of clean water, demand of high quality clean water will continue in the future.

The standards for drinking water are typically set by governments, local authorities, or industry associations, and such standards typically set limits of maximum amount of contaminants that could have in the water but still safe for human consumption. To provide clean water, various water purification techniques have been developed over the years. For example, conventional purification systems include carbon filtration, membrane filtration, chlorination, ion exchange, oxidation, and/or reverse osmosis. A drawback associated with such techniques is that conventional purification techniques may require numerous treatment steps in order to be able to remove contaminants, such as living organisms, bacteria, viruses, arsenic, lead, and mercury.

A typical approach to solve the conventional purification system is to use vapor distillation process to purify water. A problem associated with a typical water distiller is that they are large, costly, and inefficient. For example, a conventional water distiller consumes large amount of energy such as electricity to produce small amount clean or distilled water. Another problem associated with a typical household or laboratory water distiller is that it takes hours to produce one gallon of clean water. Another drawback associated with a conventional thermal based purification system is that the heat generated by a conventional heat source has low efficiency, and the heating source is typically difficult to maintain.

SUMMARY

An embodiment of the present application discloses a liquid processing system or HRP system which is capable of purifying liquid using an electromagnetic heater. The system, in one embodiment, includes a main boiler, a bottom boiler, a heating element, and a heating coil. The main boiler is structured to have a cylindrical shape and is configured to separate purified liquid from incoming liquid. The bottom boiler, configured to couple to the main boiler, holds at least a portion of incoming liquid for purification process. While the heating coil, which is situated adjacent to the heating element, is able to generate a magnetic field in accordance with an electrical current, the heating element produces heat needed for purification process in response to the magnetic field.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 19 is a 3D diagram illustrating an exemplary detail of boiler assembly of HRP system including EMH in accordance with one embodiment of the present invention;

FIGS. 20A-B are 3D diagrams illustrating different views of EMH used in the HRP system in accordance with one embodiment of the present invention;

DETAILED DESCRIPTION

Figure 1A:
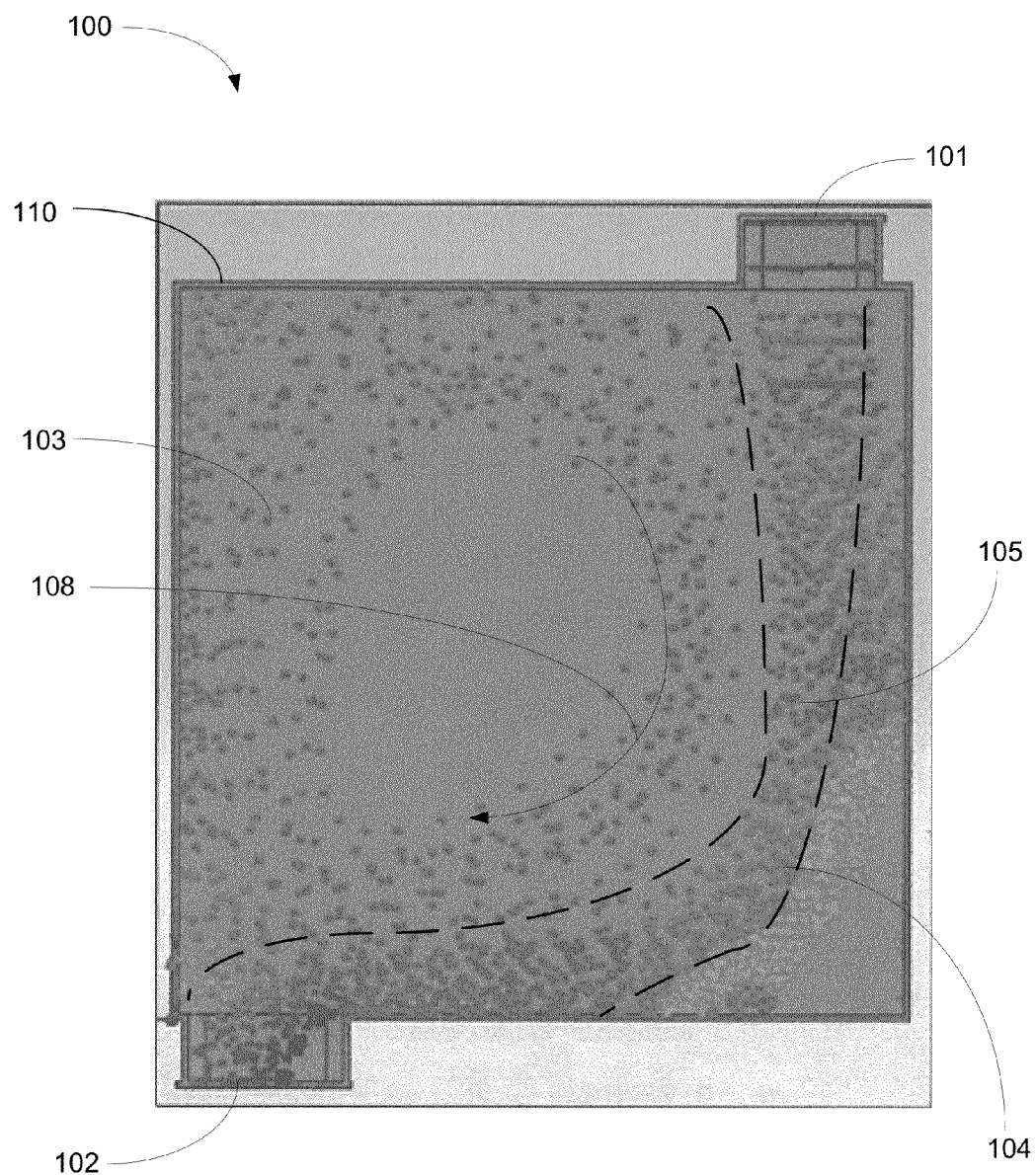
FIGS. 1A-C are diagrams illustrating an exemplary heat profile during a liquid purification process in accordance with one embodiment of the present invention.

Exemplary embodiment(s) of the present invention is described herein in the context of a method, device, and apparatus for purifying liquid using magnetic heating mechanism to achieve optimal energy efficiency.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of mechanical components, elements, sub-systems, devices, units, assemblies, mechanisms, or combinations of components thereof. The term "circuits," "computer," "integrated circuits," "electrical controller," "optical sensors," or "sensors," may include a processor, memory, and buses capable of executing instruction wherein the computer refers to one or a cluster of computers, personal computers, or combinations of computers thereof. The term "purifying" is used generically herein to describe reducing or altering concentration of one or more contaminants to a specified range.

Heat Reclaim Purification ("HRP") System

Embodiments of the present invention discloses a liquid or water purification apparatus capable of purifying liquid or water using regenerative heat exchanger. The apparatus includes a liquid receptacle, a heat exchanger, a heating mechanism, a compressor, and a condenser. The liquid receptacle, for example, is able to receive a stream of liquid such as water or liquor. In one embodiment, the liquid receptacle includes a water-input receptacle capable of receiving a flow or stream of water from an external device. The stream of water, for example, is pressurized having a range from two (2) pounds per square inch ("PSI") to 500 PSI. The water has a molecular structure of one oxygen and two hydrogen atoms connected by covalent bonds ("$H_2O$").

The heat exchanger, in one aspect, pushes or forces the received stream of liquid through the heat exchanger to preheat or increase the temperature of the liquid via at least a portion of processed liquid. The heat exchanger further includes a top or main heat exchanger and a bottom heat exchanger. While the top heat exchanger is configured to preheat incoming water with the purified water, the bottom heat exchanger preheats incoming water with the discarded water. Alternatively, the top heat exchanger is also configured to extract heat from purified water with incoming water before the purified water leaves the apparatus. The bottom heat exchanger cools down discarded water with incoming water before the discarded water leaves the apparatus as waste water.

The heating mechanism generates heat to facilitate phase transition from liquid to vapor. In one embodiment, the heating mechanism has a heater configured to heat water to a boiling point to separate purified water from impurities. The heating mechanism includes a heater, such as a burner, a magnetic inductance heat generator, resistance heating element, et cetera.

The compressor guides or forces the vapor through the condenser, wherein the compressor includes a turbine operable to create a directional vapor whirlpool inside of a boiler to force the vapor into the condenser. In one embodiment, the compressor creates a vacuum to alter the boiling point for the liquid or water to speed up the separation of purified water from incoming water.

The condenser condenses vapor into liquid or purified liquid before it leaves the apparatus. The condenser further includes a set of blades or flutes wherein each blade is shaped in such a way that it optimizes liquid condensation from vapor to purified water. In one embodiment, the liquid purification apparatus also includes a housing which is configured to house the heat exchanger which is configured to fit both the compressor and condenser in the middle of heat exchanger.

FIG. 1A is a diagram illustrating an exemplary heat profile or temperature profile during a liquid purification process in accordance with one embodiment of the present invention. Diagram illustrates a cross-section side view of a heat reclaim purification (HRP) system 100 capable of processing or purifying liquid, such as water, or any other liquid that could be purified by distillation process. HRP system 100 includes a condenser 110 having an input port 101 and an output port 102 wherein input port 101 receives gas such as water vapor while output port 102 releases processed liquid such as purified water. It should be noted that the underlying concept of the exemplary embodiment(s) of the present invention would not change if one or more components (or blocks) were added to or removed from diagram 100.

FIG. 1A illustrates a computer simulated heat or temperature profile of HRP system 100 during a water purification process using regenerative heat exchanger wherein the water vapor or vapor enters input port 101. In one embodiment, when water vapor is being rushed or forced into condenser 110 as a fast moving vapor jet or stream via a compressor, not shown in FIG. 1A, the fast moving vapor creates a directional vapor whirlpool 108 inside the condenser. The heat profile illustrates a main stream of directional vapor jet 105 moving from input port 101 to output port 102. The warmest or hottest area of the heat profile, in one aspect, is indicated by numeral 104 while the coolest area is indicated by numeral 103. In one aspect of the present invention, condenser 110 is able to produce purified water in accordance with the heat profile, and is capable of recapturing, regenerating, or reclaiming heat (or energy) released from phase transition between vapor and liquid. For example, vapor stream entering from input port 101 and exiting output port 102 as liquid gives off heat during the phase transition.

A regenerative heat exchanger facilitates two flows or streams of fluid or liquid such as coming water and exiting purified water to flow through a heat exchanger in logically opposite direction or in a configuration of countercurrent exchanger. The heat exchanger having components, such as pipes, tubes, and/or channels, is able to maintain two moving flows separated while physically adjacent with each other to facilitate heat exchange. The heat or temperature profile may remain at a nearly constant temperature which includes the entering flow (cold or ambient water) and exiting flow at each end. In regenerative heat exchangers, in one example, uses a cyclical and/or repetitive treatment or process to preheat the incoming cold water via heat released by the processed water. The processed water includes purified water and discarded water. The discarded water is also known as waste water which contains relatively high concentration of impurities.

To operate, incoming cold water enters the heat exchanger and is preheated by heat extracted from processed water exiting the heat exchanger. The regenerative heat exchanger is able to conserve energy since a large amount of the heat energy is reclaimed or recaptured in a thermodynamically reversible way. Depending on the applications, the heat exchanger can have a range of thermal efficiency from 50% to 95% by transferring heat energy from a hot directional water flow to a cold directional water flow.

Figure 1B:
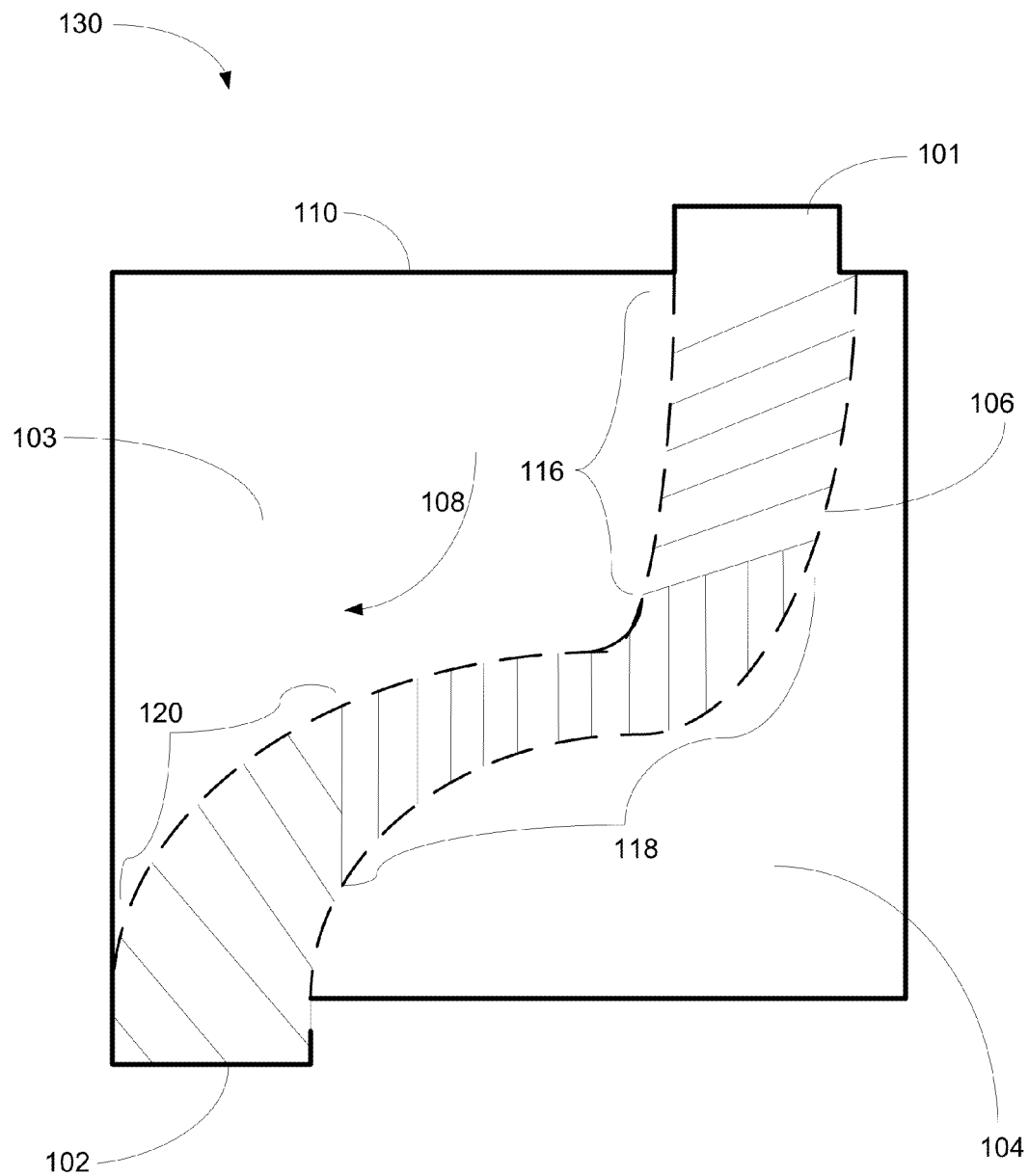

To condense vapor into purified water in accordance with the heat profile as illustrated in FIG. 1A, condenser 110 employs multiple blades or flutes 106 according to main stream of directional vapor jet 105 as illustrated in FIG. 1B. In one embodiment, blade 106 includes vapor section 116, phase changing section 118, and liquid section 120, wherein the phase changing section 118 releases heat since the water molecule gives off energy when it transforms its physical formation from vapor (or gas formation) to liquid (or fluid formation). Depending on the applications, the shape of blade or flutes 106 may change in accordance with the vapor jet. It should be noted that the term "blade" and "flute" are used interchangeably herein. Also, the term "vapor" and "water vapor" are used interchangeably herein.

Water is a chemical substance having a chemical formula $H_2O$ wherein its molecule structure contains one oxygen and two hydrogen atoms connected by covalent bonds. Depending on the temperature, water can be in different physical formation. For example, water is in a liquid formation at ambient or room temperature. Water is in vapor, steam, gas (or gaseous) formation when the temperature is at or above water's boiling point. It should be noted that the description uses water and/or water vapor as an exemplary chemical substance and the underlying concept of HRP system 100 is applicable to any other chemical substances capable of changing their physical formation in view of their boiling points as well as environmental pressure.

The boiling point of a chemical substance such as water is a temperature wherein vapor pressure of fluid is similar to surrounding or environmental pressure over the fluid or liquid. If the chemical substance in its liquid formation such as water, it has a lower boiling point in a low pressure or vacuum environment than when the water is at atmospheric pressure. Similarly, water or liquid has a higher boiling point in a high pressure surrounding than the water is at atmospheric pressure. As such, different chemical substance having different chemical compounds possesses different boiling points. Accordingly, the fluctuation of boiling point for a particular chemical substance such as water is a function of temperature and pressure.

Figure 1C:
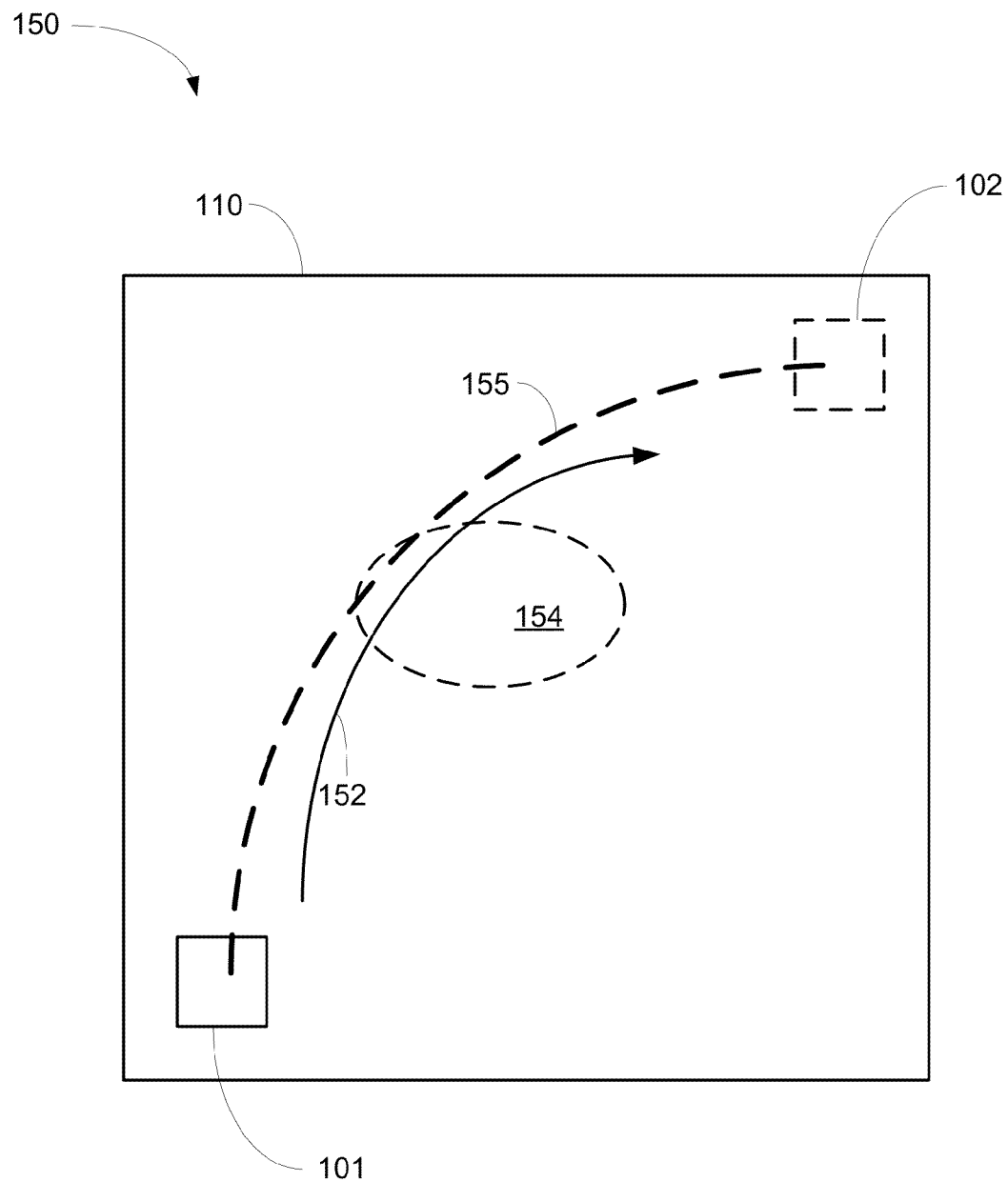

FIG. 1C is a diagram 150 illustrating a top view of the diagram in FIG. 1A showing an exemplary heat profile during a liquid purification process in accordance with one embodiment of the present invention. With respect to diagram 100, input port 101 is situated on the top of condenser 110 at the lower left corner while output port 102 is situated at the bottom of upper right corner of condenser 110. A directional steam or vapor jet 152 is formed whereby pressurized vapor jet entering input port 101 and exiting output port 102 according to a vapor flow traveling path 155. In one aspect, the heat exchange occurs at area 154 which is generally the hottest/warmest spot in the directional vapor jet 152. It should be noted that converting water into vapor requires sufficient energy required to vaporize water into vapor.

Figure 2:
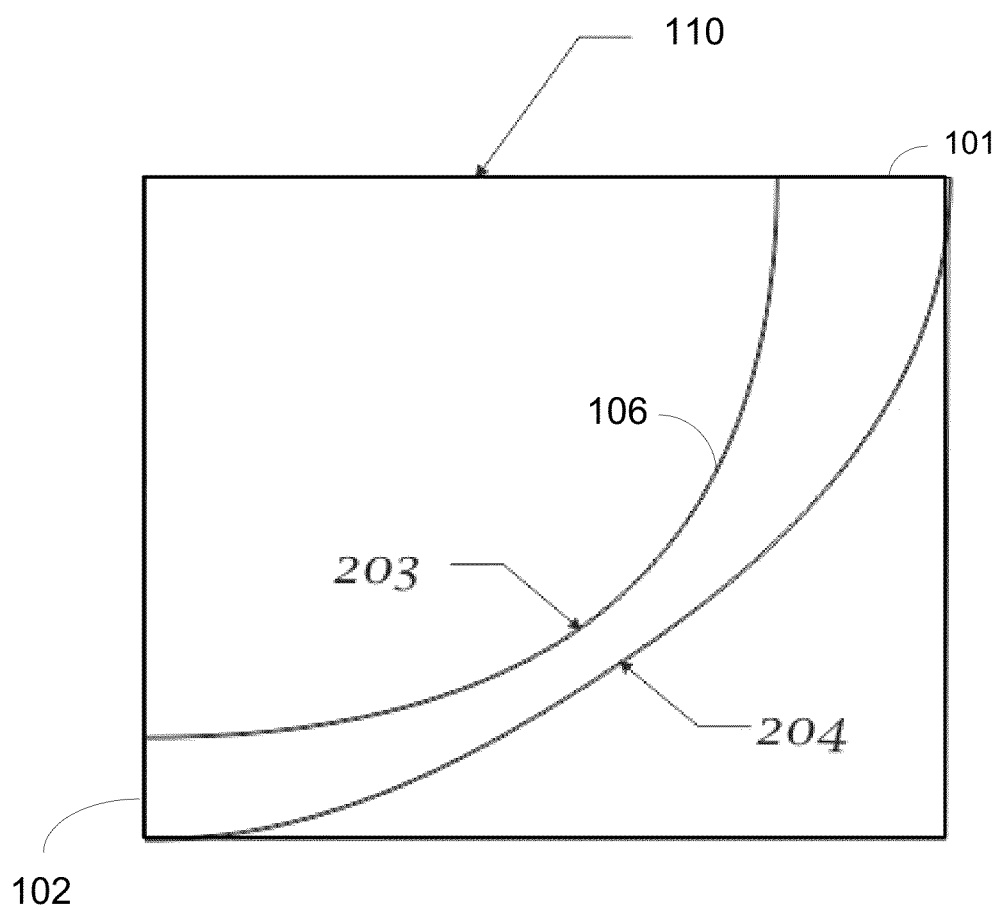
FIGS. 2-3 are diagrams illustrating configurations of blades or flutes for condensation in accordance with one embodiment of the present invention.
Figure 3:
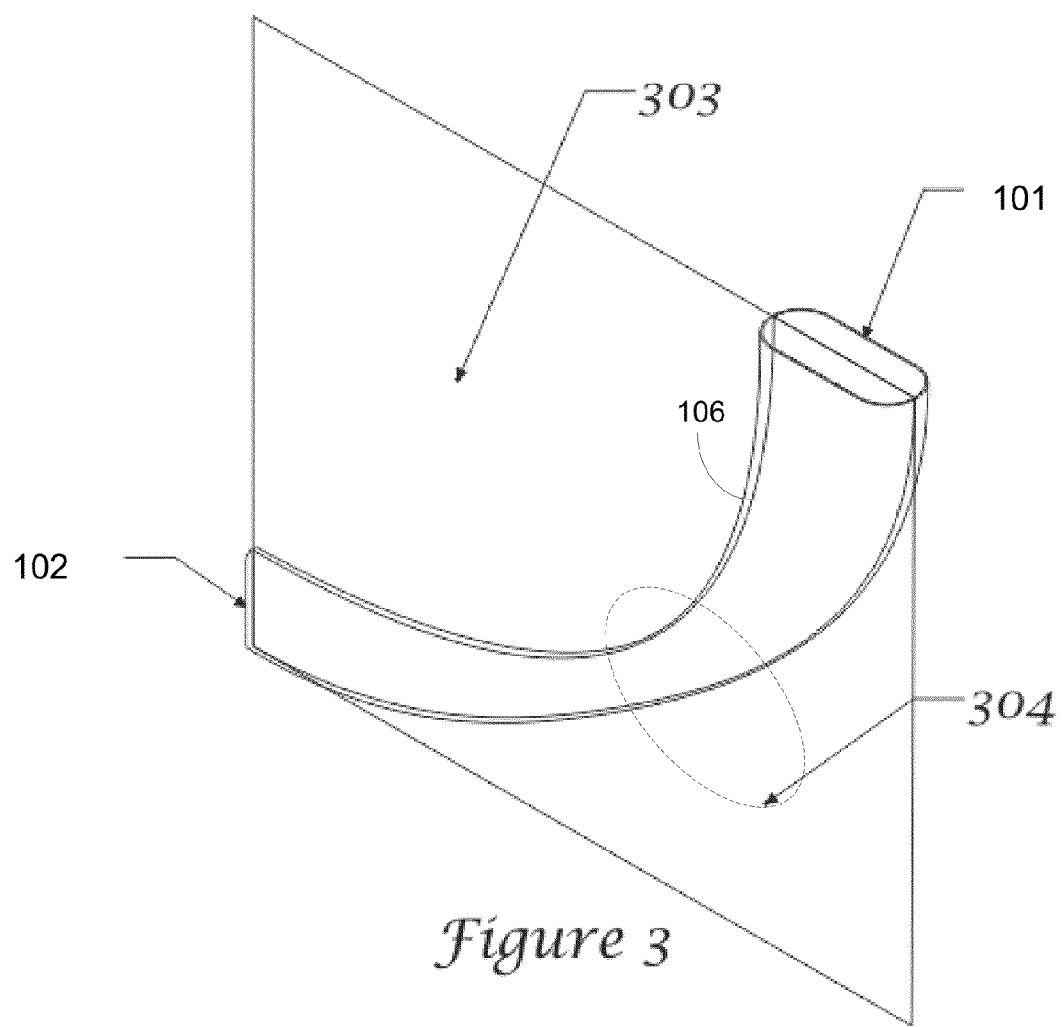

FIG. 2 illustrates condenser 110 having a blade 106 configured in accordance with one embodiment of the present invention. The shape of blade 106 is structured and/or configured in accordance with the shape of directional vapor jet 105 as shown in FIG. 1A. Blade 106 includes an input port 101 and an output port 102. Depending on the applications, the shape of blade 106 may vary. For example, a narrow section 203-204 of blade 106 may change depending on volume and speed of vapor flow. FIG. 3 illustrates a three dimensional ("3D") view of blade 106 with input port 101. In one aspect, the area pointed by numeral 304 is the warmest area while the area pointed by numeral 303 is the coolest in the condenser.

Figure 4:
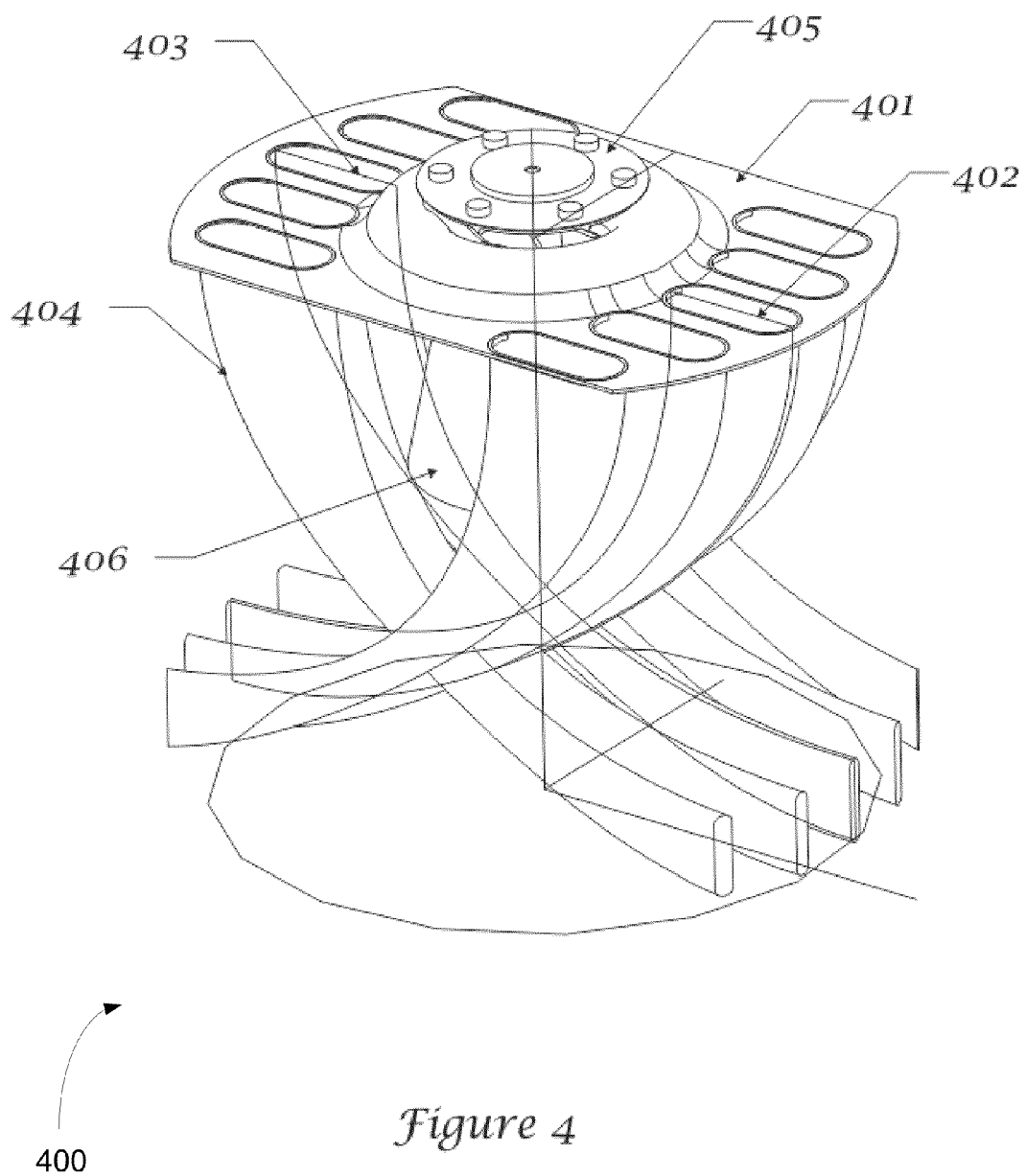
FIG. 4 is a diagram illustrating an isometric view of a turbine and condenser blades for liquid purification process in accordance with one embodiment of the present invention.

FIG. 4 is an isometric diagram 400 illustrating a turbine and condenser blades for liquid purification process in accordance with one embodiment of the present invention. Diagram 400 shows a structural layout between a turbine 405, multiple blades 404, and a flow guide 406. Turbine 405, in one embodiment, includes a motor and turbine blades configured to create a vacuum or low pressure area in the vicinity of flow guide 406. The motor and turbine blades, for example, can be fabricated by any applicable materials, such as aluminum, stainless steel, plastic, polymer, alloy, ceramic, and/or a combination of one or more of aluminum, stainless steel, plastic, polymer, alloy, and ceramic. The turbine provides a vacuum area above the incoming liquid (water) and reduces the boiling point of the liquid. The turbine acts as a compressor lowering the pressure whereby reducing boiling point of the liquid. A top plate 401 is used to anchor and/or secure turbine 405 as well as blades or flutes 404.

Flow guide 406, which may be in a cone shape, is configured in such a way that it creates and guides a directional vapor whirlpool between heat source, not shown in FIG. 4, and turbine 405 in response to the vacuum generated by turbine 405. During an operation, upon creation of the vacuum, one or more directional vapor flows are generated in accordance with the directional vapor whirlpool. The directional vapor flows are subsequently guided, pushed, and/or forced into input ports 402-403 of blades or flute 404. When vapor flows are highly compressed and pass through narrow portions of flutes 404, the physical phase transition takes place as vapor flows are condensed into purified water. The heat or energy released as a result of phase transition is added to the heat source to generate more vapors. Note that turbine 405 and flow guide 406 are at least part of compressor.

Figure 5:
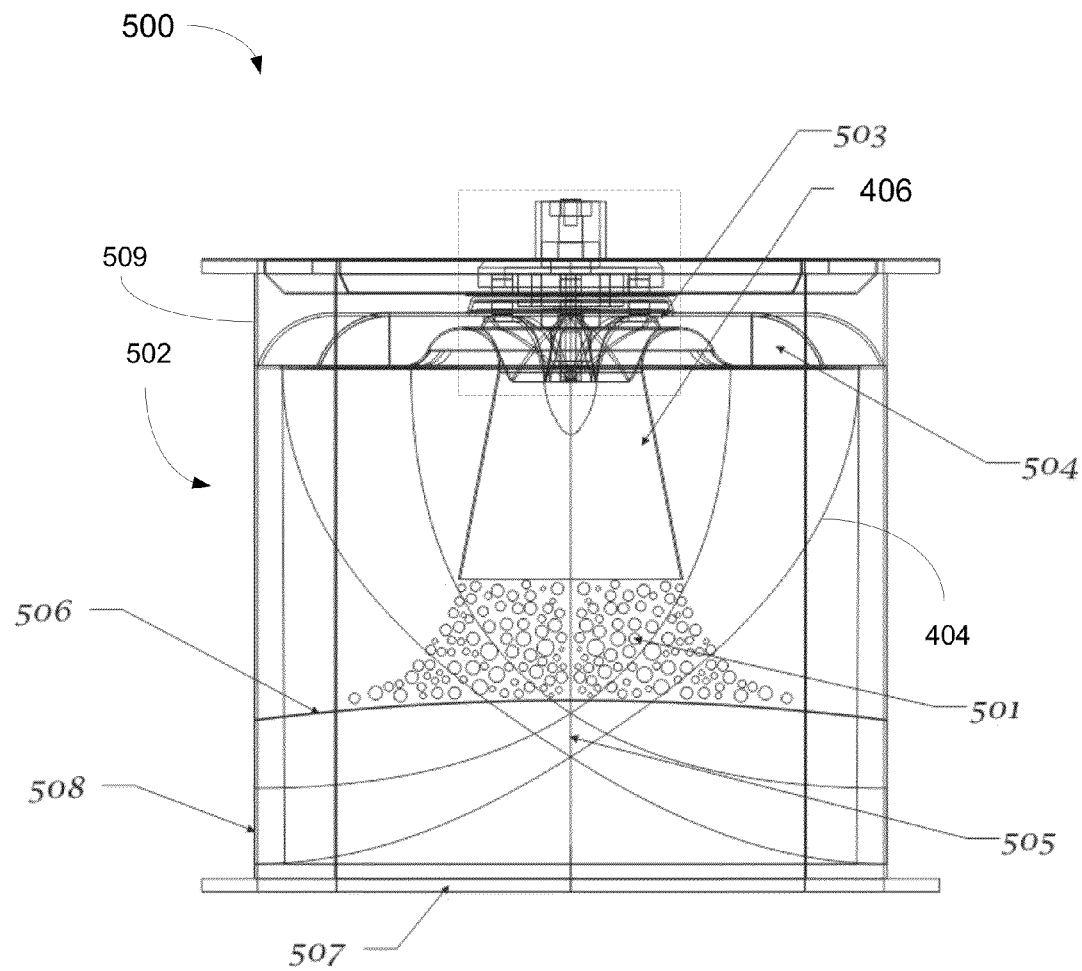
FIG. 5 is a diagram illustrating a cross-section view of liquid purification apparatus or system in accordance with one embodiment of the present invention.

FIG. 5 is a diagram 500 illustrating a cross-section view of liquid purification apparatus or HRP system in accordance with one embodiment of the present invention. Diagram 500 includes a main boiler 502, bottom boiler-collector 508, upper-manifold 510, center-manifold 506, and lower-manifold 507, wherein the manifolds are used to separate bottom boiler-collector 508 from main boiler 502. In one embodiment, main boiler 502 is used to process or produce purified water while bottom boiler-collector 508 is used to process or discard the waste water, substances with impurities, and/or discarded water. It should be noted that the underlying concept of the exemplary embodiment(s) of the present invention would not change if one or more components (or blocks) were added to or removed from diagram 500.

Upper-manifold 509 is coupled to turbine 503, blades 404, and flow guide 406. A function of upper-manifold 509 is to distribute vapor flows from main boiler 502 to blades 404 via various manifold channels 504 after vapor 501 is drawn up by turbine 503 from the bottom of main boiler 502 near the heat source to the top of main boiler 502. In an alternative embodiment, a compressor, which includes turbine 503 and flow guild 406, is coupled to upper-manifold 509 to create a vacuum area near the top of main boiler 502 for generating a directional vapor whirlpool.

The vapor flows are pressurized and condensed at the narrow regions of condenser blades 404 around epic center 505 which is the area that heat exchange occurs. In one aspect, epic center 505 is hottest or warmest area in main boiler 502. Epic center 505 is created when pressurized vapor flows through narrow portions of flutes 404 and the physical phase transition takes place around epic center 505. When vapor is condensed into purified water, heat or energy is released as a result of phase transition.

Figure 6A:
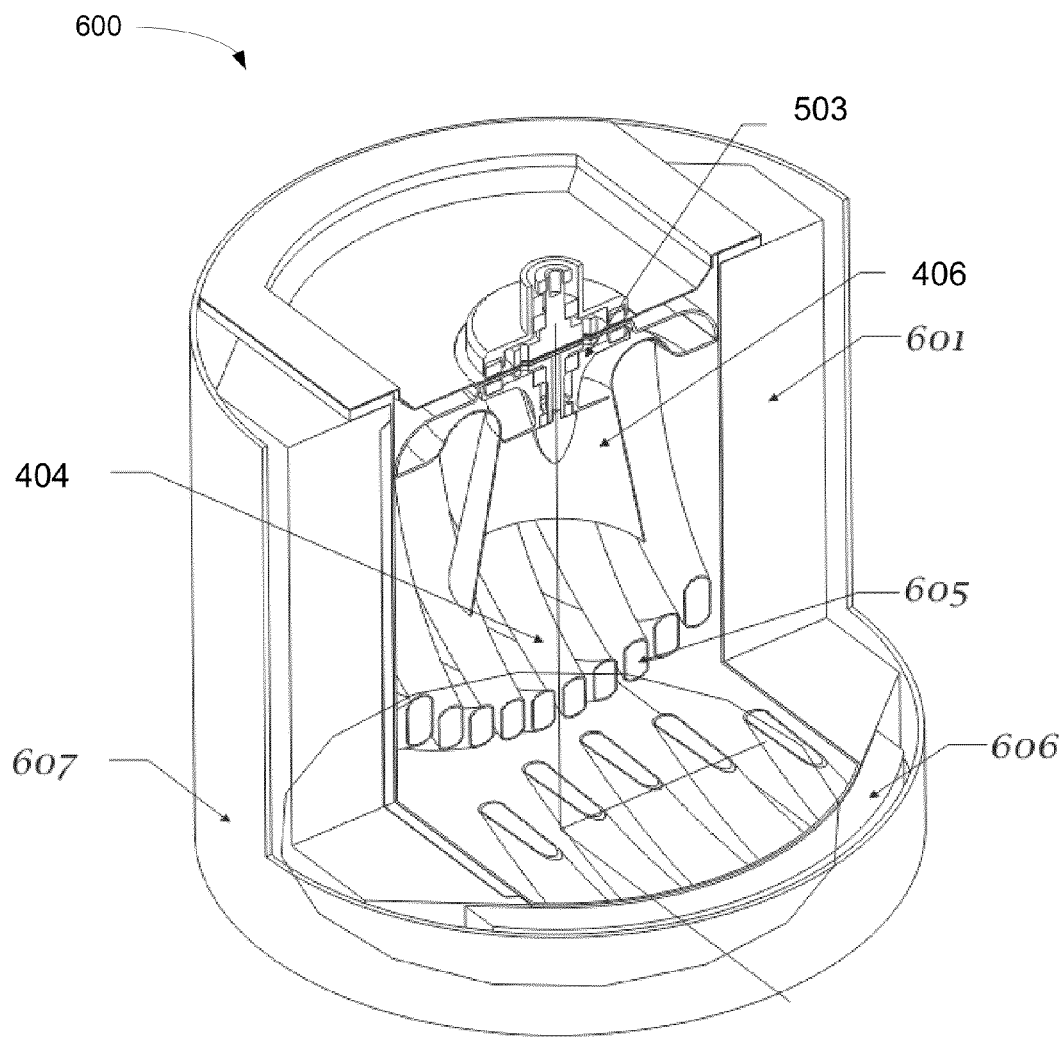
FIG. 6A is a diagram illustrating a cutaway perspective view of a liquid purification system using a heat regenerative mechanism in accordance with one embodiment of the present invention.

FIG. 6A is a diagram 600 illustrating a cutaway perspective view of HRP system using a heat regenerative mechanism in accordance with one embodiment of the present invention. Diagram 600 includes turbine 503, flow guide 406, blades 404, heat exchanger 601, bottom heat exchanger 606, and a housing 607, wherein housing 607 houses all components of HRP system. In one aspect, cut-open areas 605 of blades 404 are the epic center where larger amount of heat is generated by the phase transition or heat exchange. Heat exchanger 601 is used to extract heat from purified water as it flows out of the HRP system. The extracted heat is used to preheat the coming water. Bottom heat exchanger 606 is used to extract heat from waste water or liquid containing high concentration of impurities. Again, the extracted heat from the waste water is used to preheat the incoming cold water. The housing is outer element of heat exchangers 607 which is comprised of double-walled, vacuumed element. The housing element is used to provide mechanical and structure support for enclosed components, and also acts as a thermal energy rectifier and retainer.

Figure 6B:
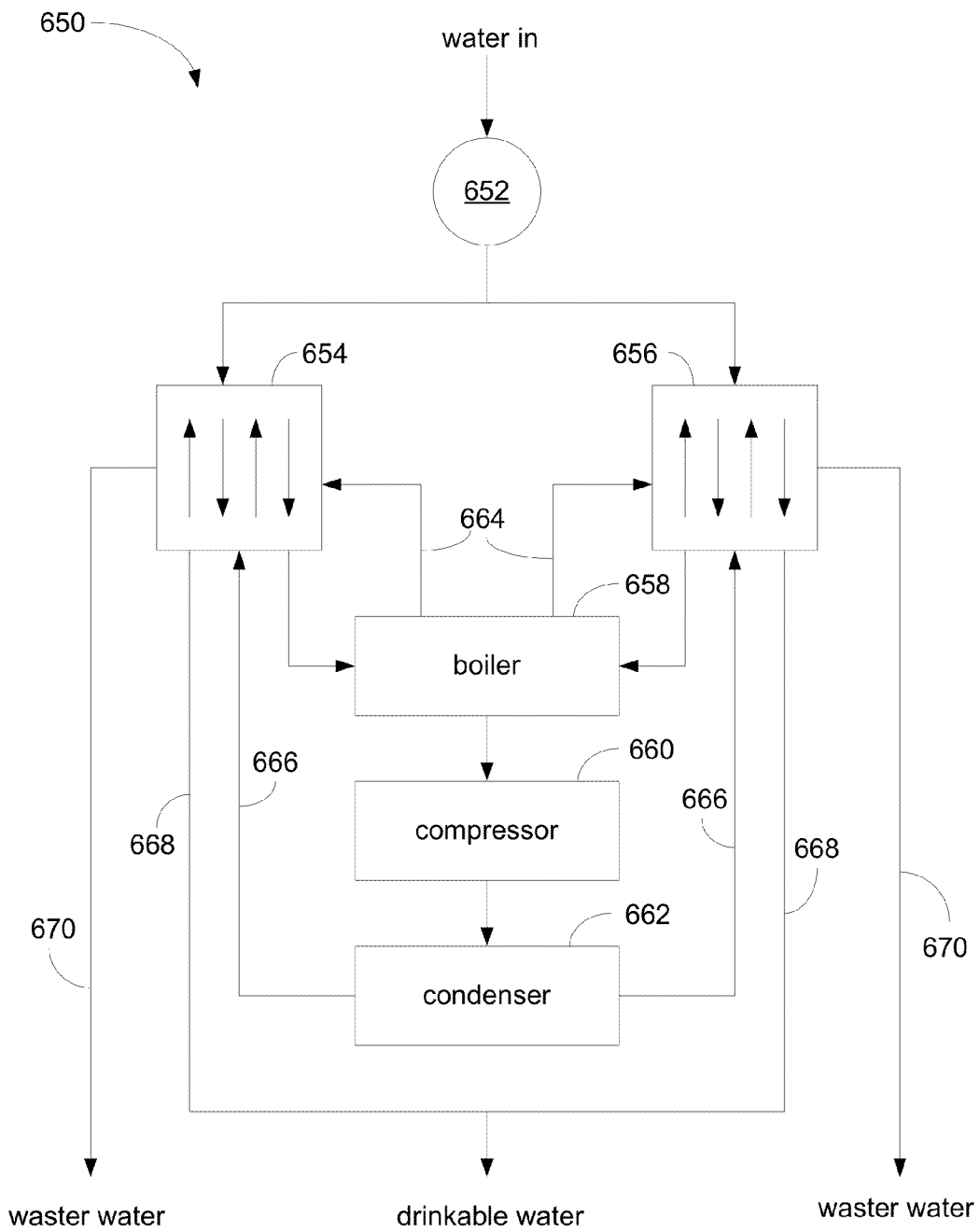
FIG. 6B is a logic block diagram illustrating an exemplary process of purifying liquid using heat regenerative mechanism in accordance with one embodiment of the present invention.

FIG. 6B is a logic block diagram 650 illustrating an exemplary process of purifying liquid using heat regenerative mechanism in accordance with one embodiment of the present invention. Diagram 650, which can be implemented in HRP system, includes a first heat exchanger 654, second heat exchanger 656, boiler 658, compressor 660, and condenser 662. In one aspect, first heat exchanger 654 is the main or top heat exchanger situated around the main boiler and second heat exchanger 656 is the bottom heat exchanger situated around the bottom boiler. It should be noted that the underlying concept of the exemplary embodiment(s) of the present invention would not change if one or more blocks were added to or removed from diagram 650.

In operation, when incoming water passes through a pump 652, the incoming water flows through both heat exchangers 654-656 to be preheated by the processed water. After flowing through heat exchangers 654-656, incoming water flows into boiler 658 to convert from water to steam or vapor via a heat source or a burner. Compressor 660 pushes or forces converted steam or vapor into condenser 662. The heavy (or waste) water or water containing high concentration of impurities flows back to heat exchangers 654-656 via channels 664 before it is being discarded via channel 670. Condenser 662 converts steam or vapor back into liquid or purified water and subsequently guides the purified water back to heat exchanger 654-656 via channels 666. Exchangers 654-656 extracts heat from purified water before allowing the purified water to exit the HRP system via channel 668.

It should be noted that, in addition to purifying water or liquid, exemplary process of purifying liquid using heat regenerative mechanism illustrated in FIG. 6B is applicable to any liquid substance purification process that uses vacuum, pressure and temperature as a controls of the environment for vapor condensation phase distillation.

Figure 7:
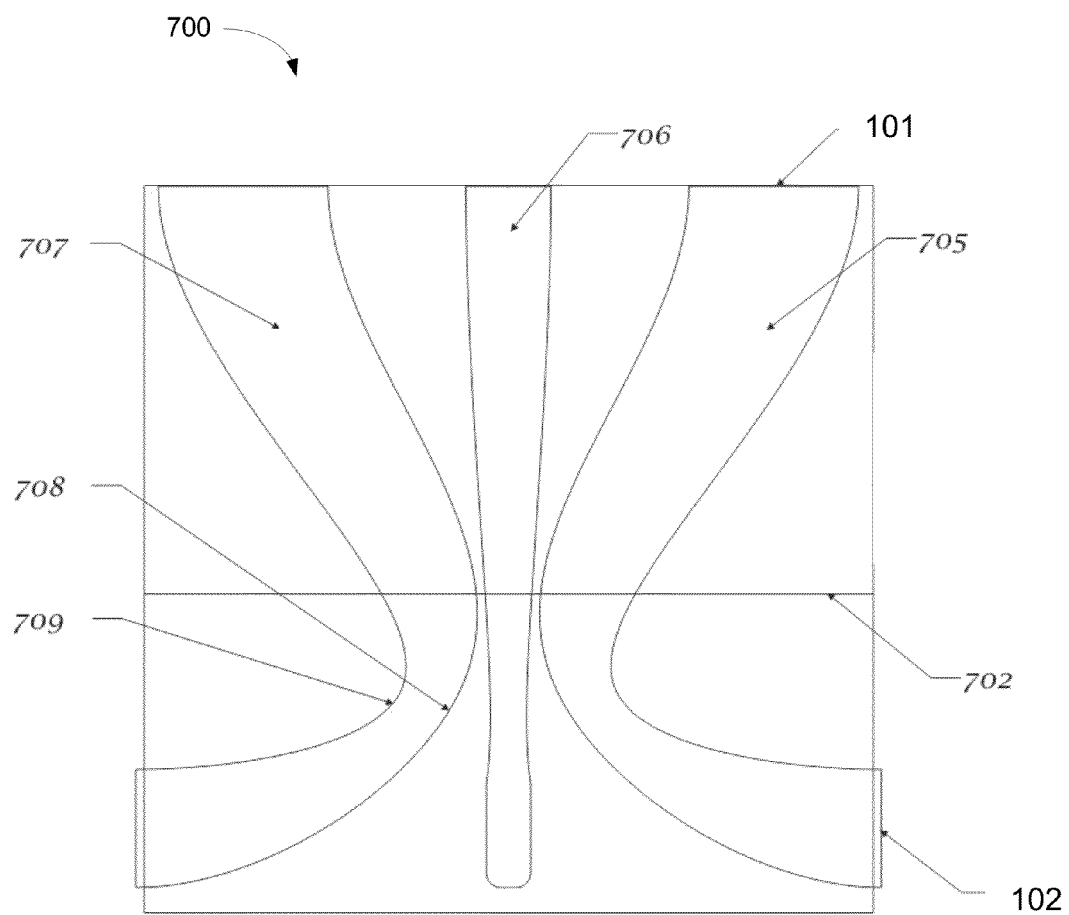
FIGS. 7-9 illustrate alternative designs or configurations to manufacture blades or flutes to achieve optimal heat exchange and vapor condensation in accordance with embodiments of the present invention.
Figure 8:
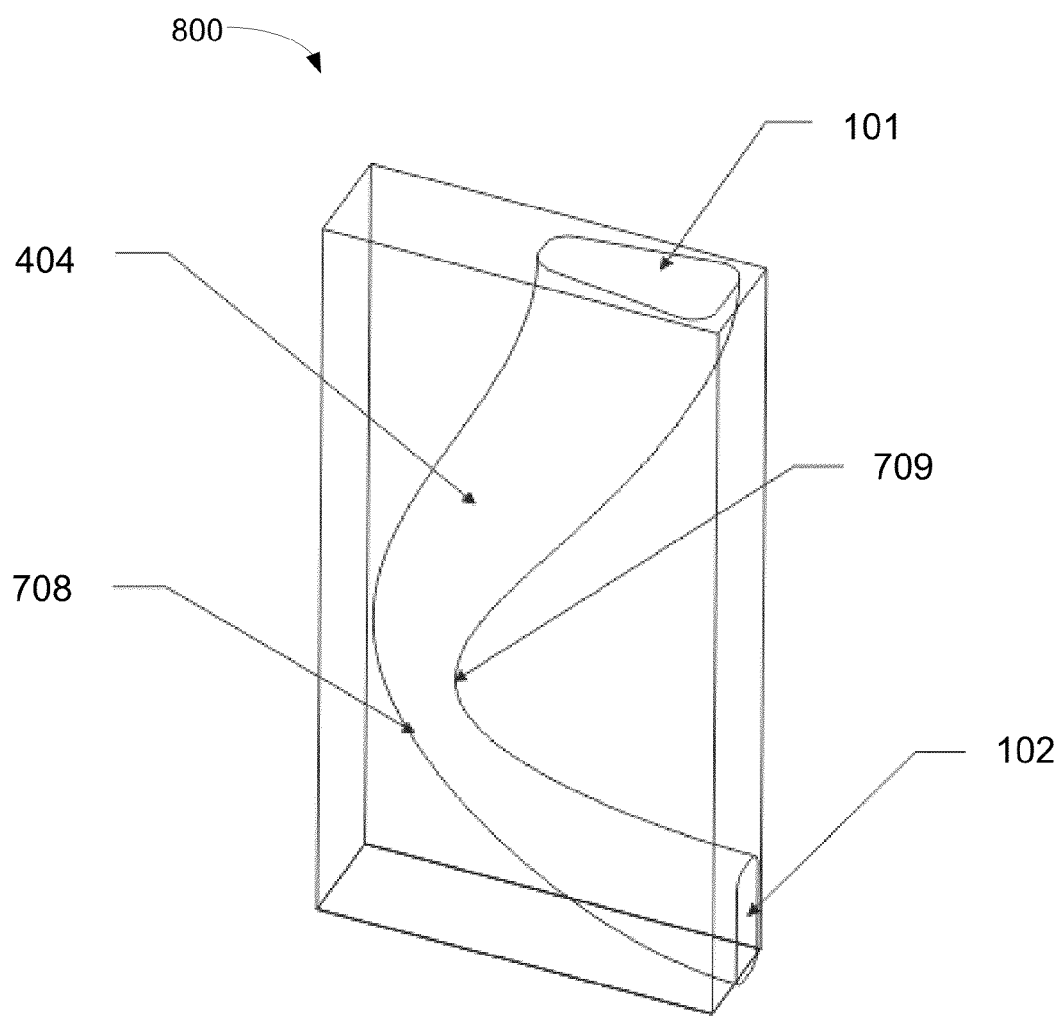

FIG. 7 is a diagram 700 illustrating an alternative design or configuration of blades or flutes to achieve optimal heat exchange and vapor condensation in accordance with embodiments of the present invention. Diagram 700 shows three (3) blades 705-707 wherein the distance between the points indicated by numeral 708-709 is application dependent. Line 720 indicates an area for phase transition between steam and water. FIG. 8 illustrates a 3D perspective view showing a blade which is similar to the blade shown in FIG. 7.

Figure 9:
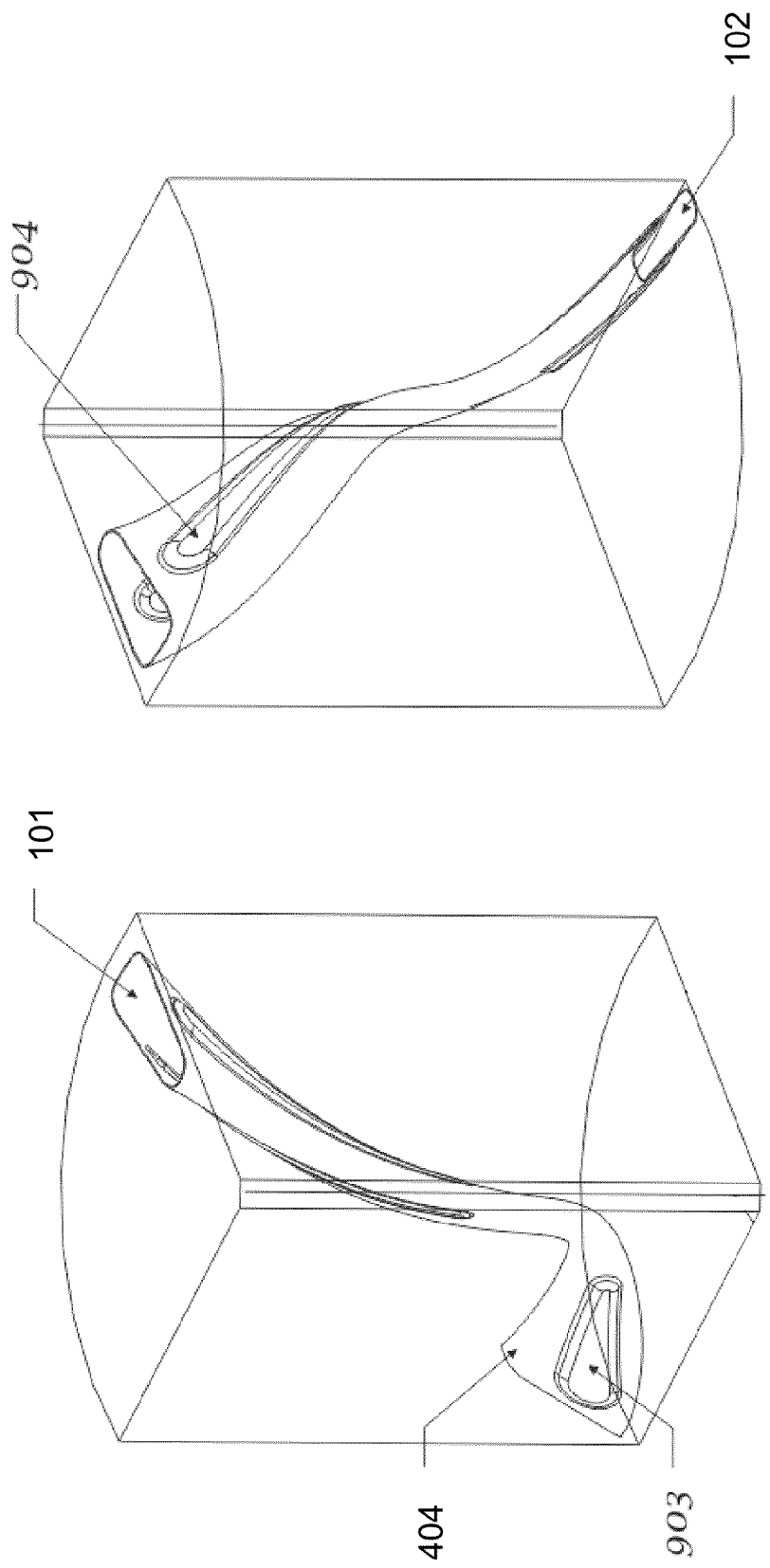

FIG. 9 illustrates alternative designs or configurations to blades or flutes to achieve optimal heat exchange and vapor condensation in accordance with embodiments of the present invention. In one embodiment, blades 404 shown in FIG. 9 includes one or more features 903-904 to reinforce the structure of blades especially if the blade is made of thin and pliable material such as stainless steel or titanium or alloy are used. The feature is to aid and to retain the shape of blade profile. Structural reinforcements by features 903-904 may be necessary to maintain the configuration of blades which are under continuous fluctuation of pressure and temperature. Fine element analysis produces improved performance of mechanical stability when temperature and pressure changes occur. It should be noted that the shape of blades illustrated in FIG. 9 is different from the shape of blades illustrated in FIG. 8. Depending on the applications, one configuration can have better results (more efficient) than another configuration.

Figure 10:
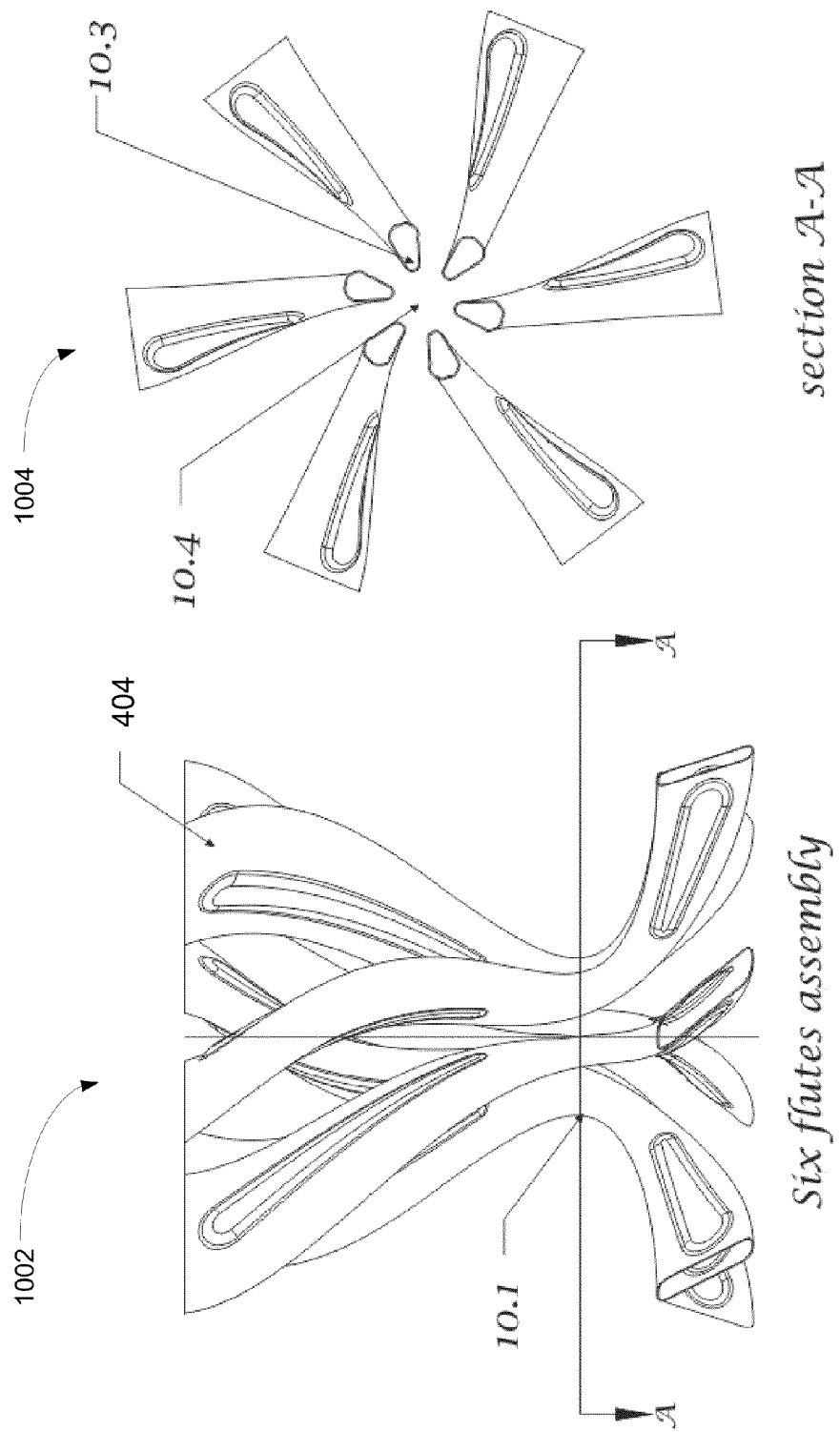
FIGS. 10-13 illustrate alternative configurations of vapor condensers including multiple flutes or blades assemblies in accordance with one embodiment of the present invention.

FIG. 10 illustrates an exemplary configuration of vapor condensers including six (6) flutes or blades in accordance with one embodiment of the present invention. FIG. 10 shows diagram 1002 containing six flutes assembly and diagram 1004 illustrating a cross-section view of diagram 1002 in accordance with section line A-A. It should be noted that areas pointed by numeral 10.1-10.4 are location(s) where phase transition occurs.

Figure 11:
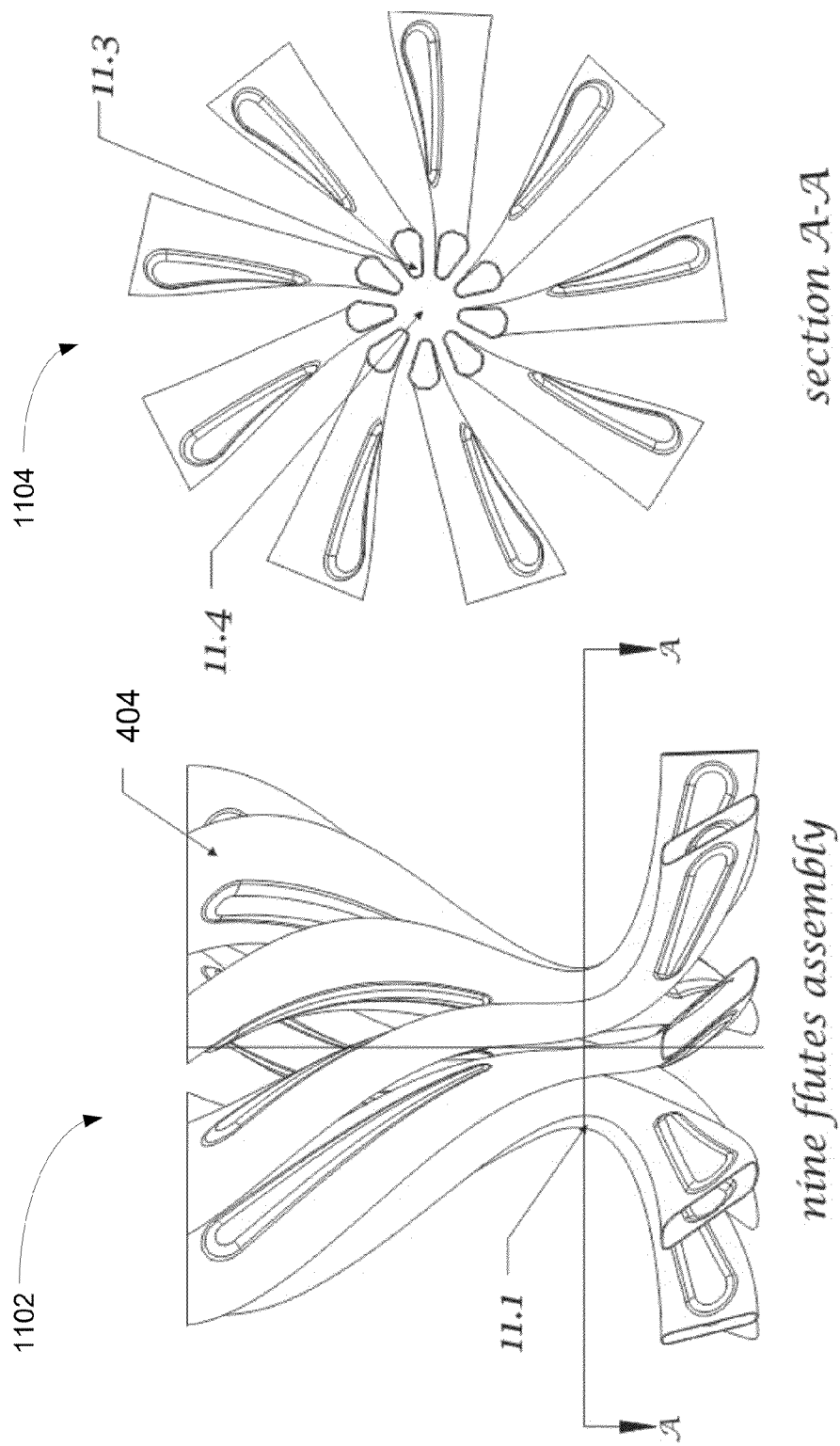

FIG. 11 illustrates an exemplary configuration of vapor condensers including nine (9) flutes assemblies in accordance with one embodiment of the present invention. FIG. 11 shows diagram 1102 containing nine flutes assembly and diagram 1104 illustrating a cross-section view of diagram 1102 in accordance with section line A-A. It should be noted that areas pointed by numeral 11.1-11.4 are locations where phase transition occurs.

Figure 12:
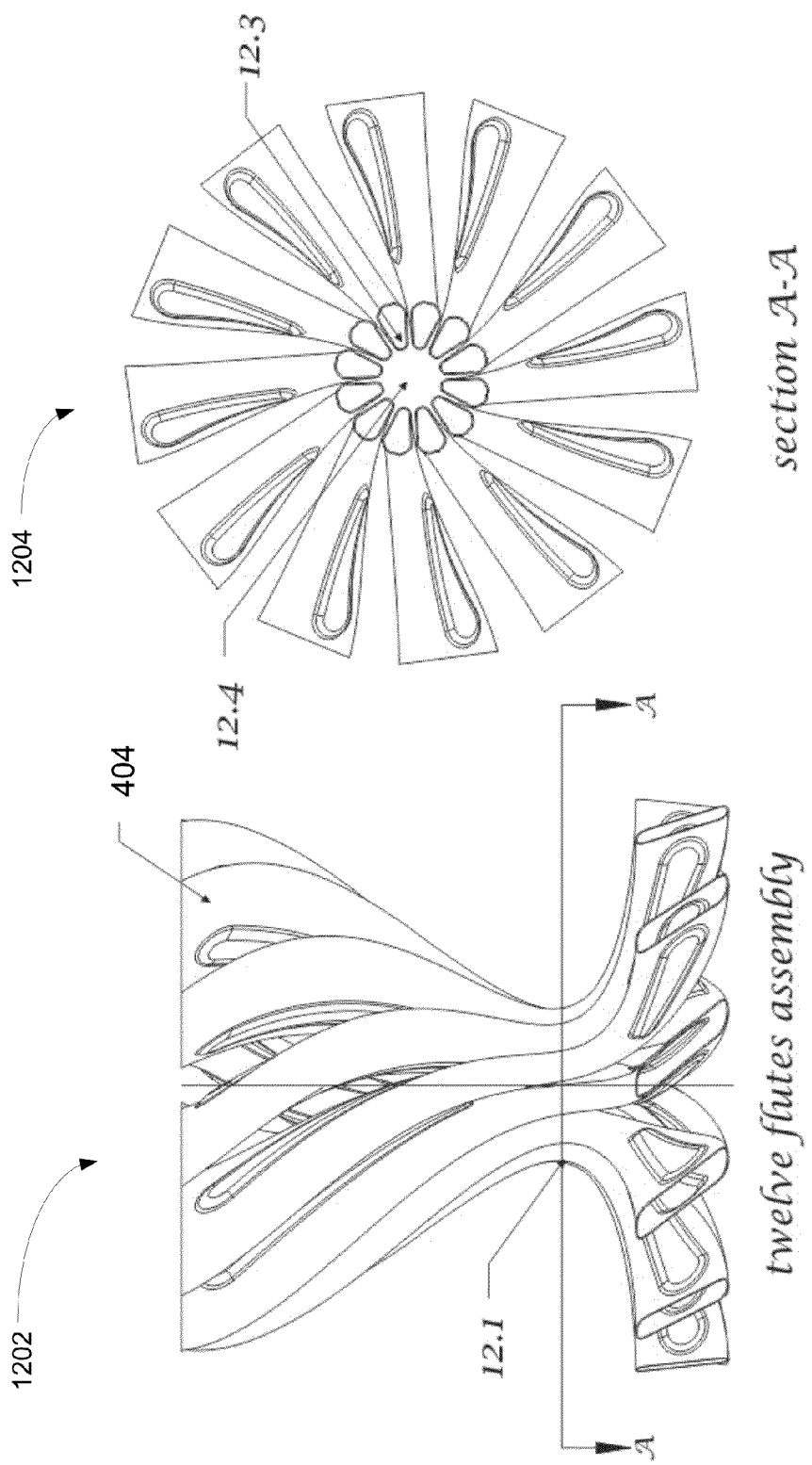
Figure 13:
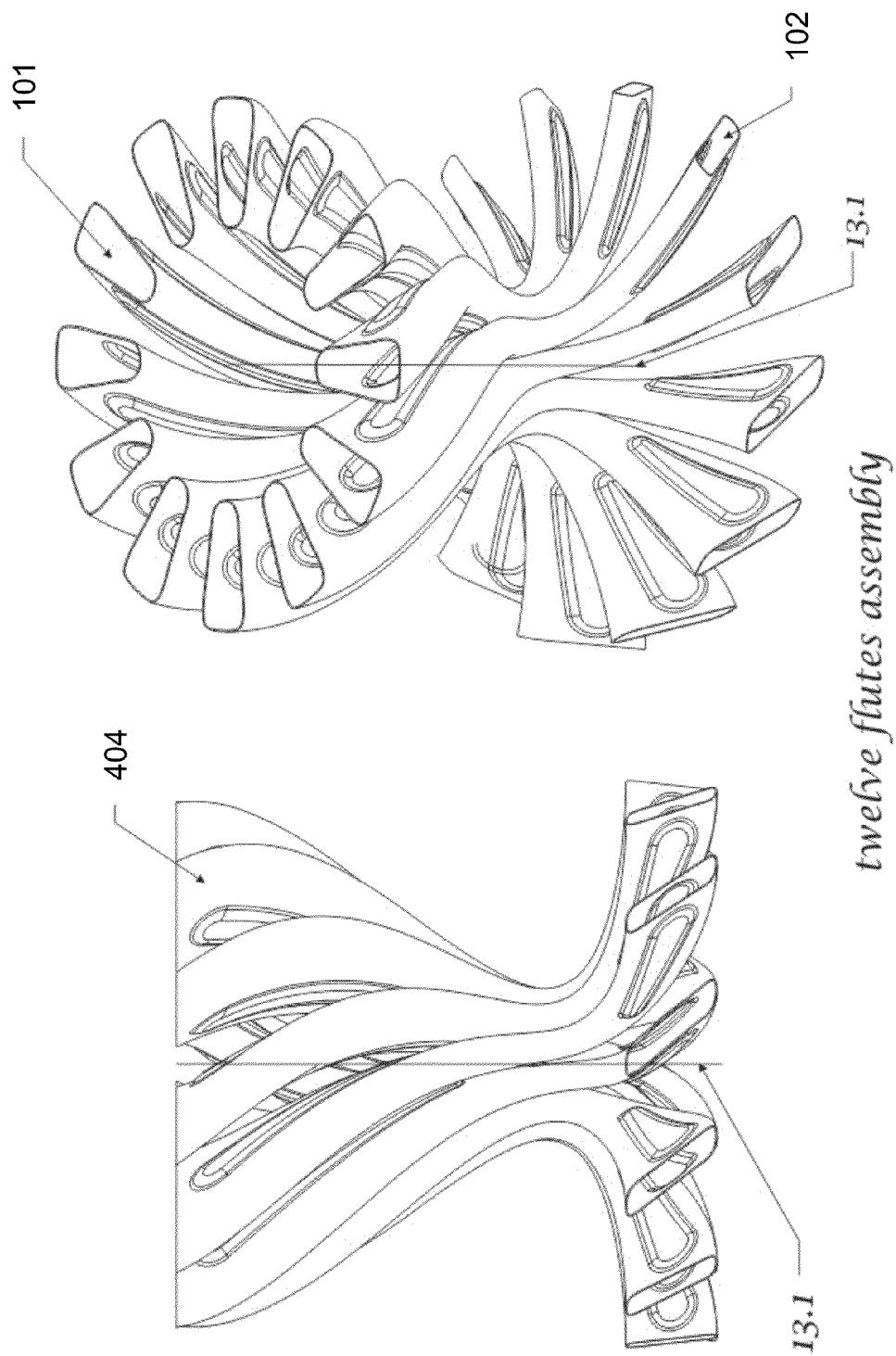

FIGS. 12-13 illustrate an exemplary configuration of vapor condensers including twelve (12) flutes assembly in accordance with one embodiment of the present invention. FIG. 12 shows diagram 1202 containing nine flutes assembly and diagram 1204 illustrating a cross-section view of diagram 1202 in accordance with section line A-A. It should be noted that areas pointed by numeral 12.1-12.4 are locations where phase transition occurs. FIG. 13 illustrates a 3D view of vapor condensers having twelve (12) flutes assembly. Note that numeral 13.1 points the middle section of the boiler.

Figure 14:
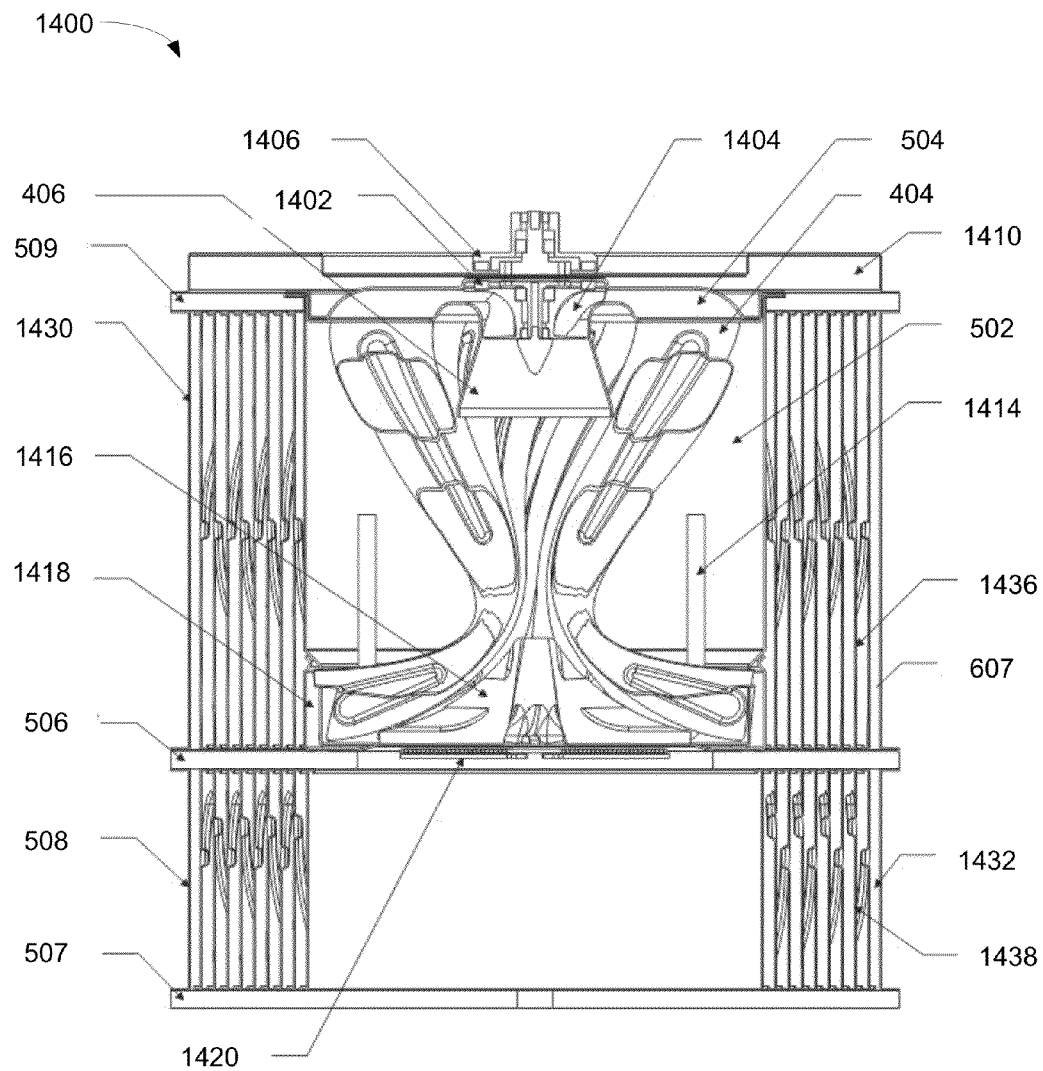
FIG. 14 is a diagram illustrating a cross section view of a main assembly capable of regenerating or reclaiming heat from processed liquid to achieve optimal energy efficiency in accordance with one embodiment of the present invention.

FIG. 14 is a diagram 1400 illustrating a cross-section view of a main assembly or HRP system capable of regenerating or reclaiming heat from processed liquid to achieve optimal energy efficiency in accordance with one embodiment of the present invention. Diagram 1400 includes a turbine 1402, main boiler 502, cover 1410, heat exchanger 1430, bottom heat exchanger 1432, directional heater 1416, and heat source 1420. Turbine 1402, in one aspect, further includes a motor 1406 and a turbine blade 1404. It should be noted that the underlying concept of the exemplary embodiment(s) of the present invention would not change if one or more components (or blocks) were added to or removed from diagram 1400.

In one embodiment, heat exchanger 1430 and bottom heat exchanger 1432 are interconnected wherein heat exchanger 1430 uses multiple pipes and/or tubes to extract heat from purified water when it passes through heat exchanger 1430. Bottom heat exchanger 1432 also employs various tubes to extract heat from waste water when it passes through bottom heat exchanger 1432. Heat exchanger 1430-1432 includes at least two independent sets of tubes or pipes 1436-1438 allowing incoming water which is cold to occupy one set of tubes while allowing processed water which is hot to occupy another set of tubes. Heat exchanger 1430-1432 further includes entrances 1418 capable of accepting processed water from the condenser to the heat exchanger.

Heat source 1420, which can be powered by electricity, solar, wind power, gasoline, or mechanical manual power generator, is coupled with heat guide or directional heater 1416 to convert water molecules from liquid formation to vapor formation. A function of posts 1414 is to anchor various components. It should be noted that HRP system 1400 may include additional electronic components at bottom boiler 508.

Figure 15:
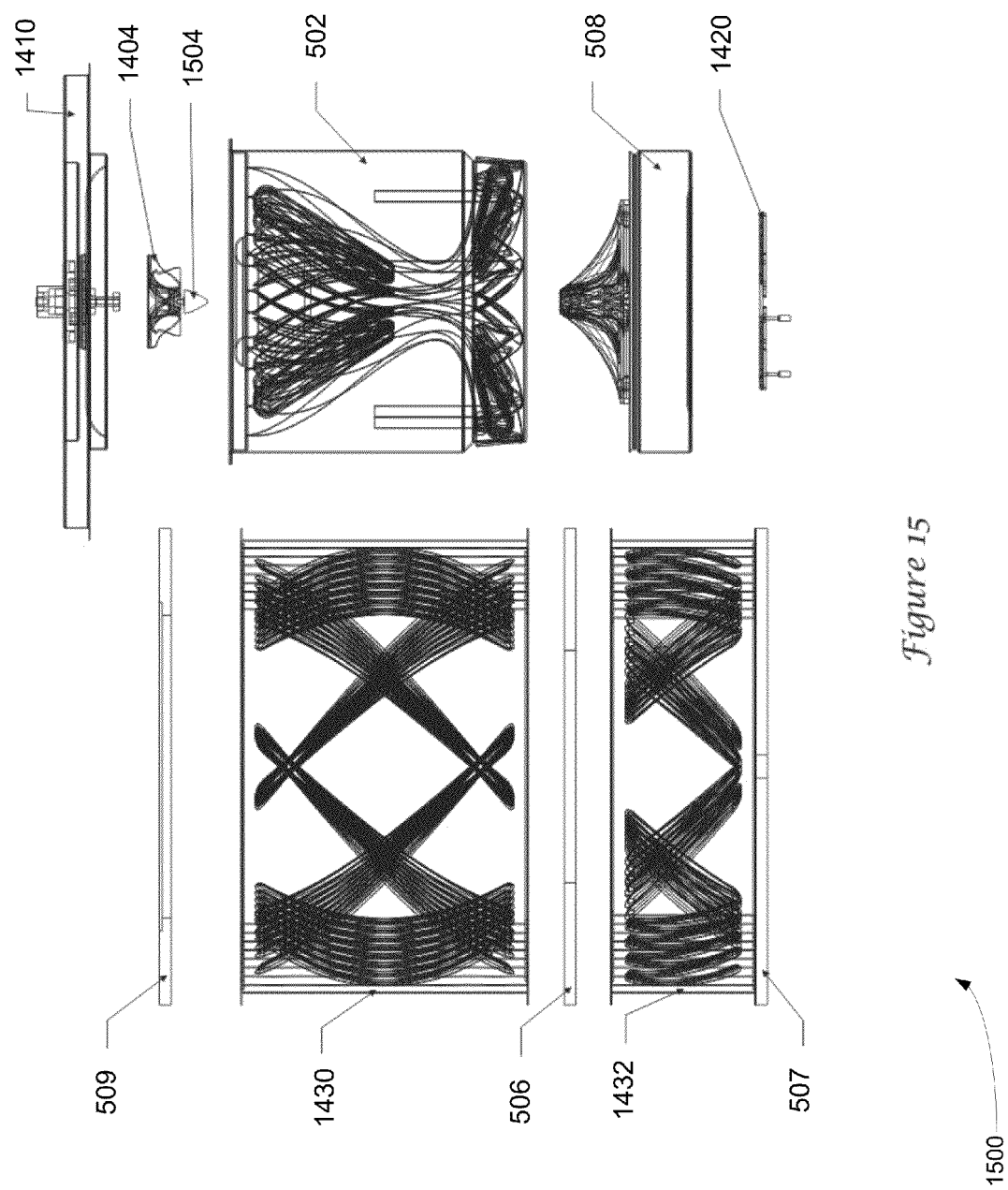
FIG. 15 illustrates an exemplary heat exchanger capable of reclaiming heat from processed liquid in accordance with one embodiment of the present invention.

FIG. 15 is a diagram 1500 illustrating an exemplary heat exchanger flow profile showing heat reclaiming process from processed liquid in accordance with one embodiment of the present invention. Diagram 1500 includes a turbine, a boiler 502, a top heat exchanger 1430, and a bottom heat exchanger 1432. The turbine includes a turbine blade 1404 and a nut 1504 wherein the turbine provides a vacuum above the incoming water to reduce the boiling point of the incoming water. The incoming water is preheated by the heat extracted from the processed water before it exits the HRP system. In one embodiment, the processed water or liquid is channeled by one or more pumps scattered across the heat exchanger(s) wherein the pumps, in one embodiment, are powered by pressurized incoming water. Note that the liquid is on outside of heat exchange tubes and the vapor and condensed liquid is on the inside of heat exchanger tubes. It should be noted that the underlying concept of the exemplary embodiment(s) of the present invention would not change if one or more components (or blocks) were added to or removed from diagram 1500.

Figure 16:
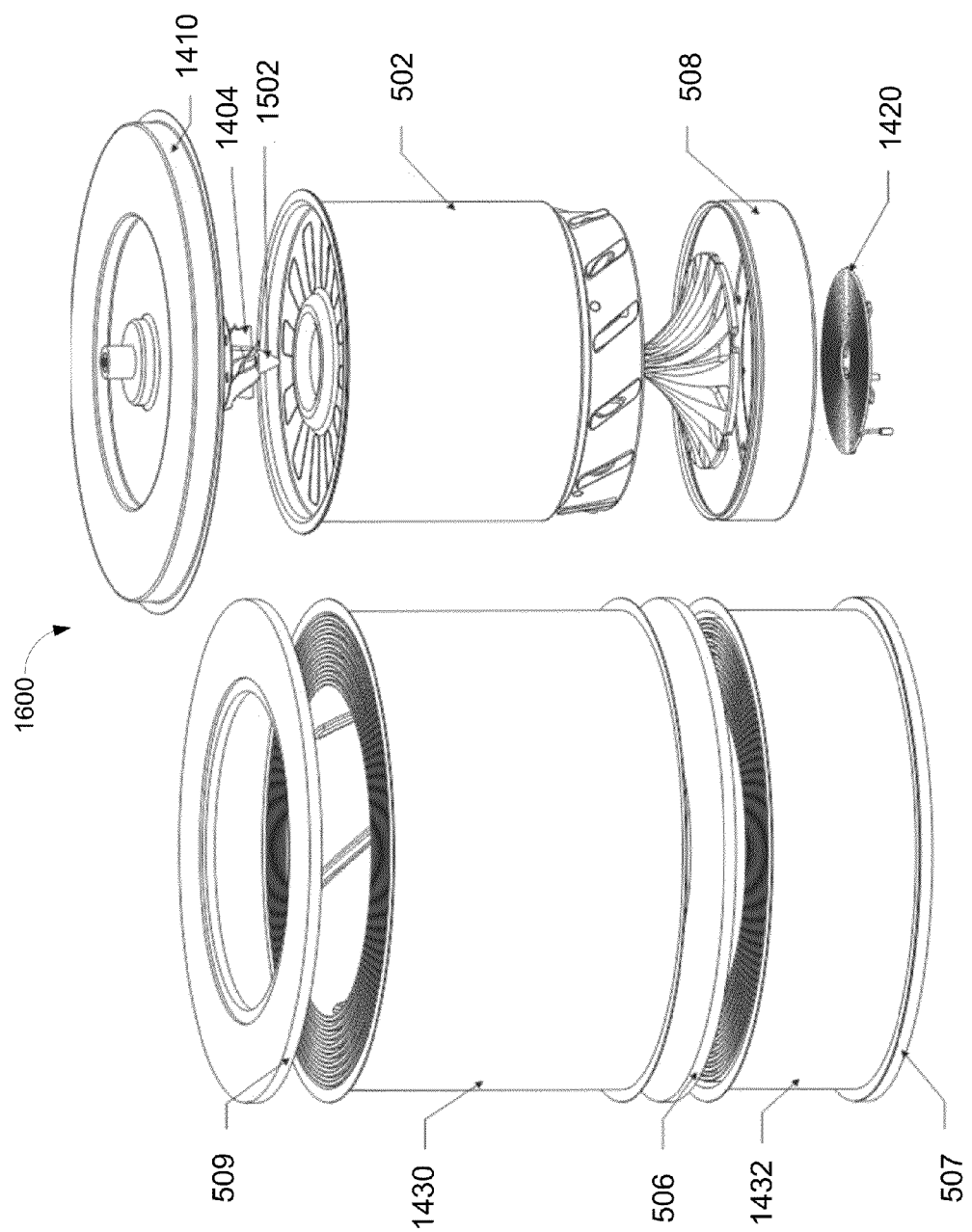
FIG. 16 is an exploded view of a main assembly configured to process liquid using heat regenerative mechanism in accordance with one embodiment of the present invention.

FIG. 16 is a diagram 1600 illustrating an exploded view of a main assembly or HRP system configured to process liquid using heat regenerative mechanism in accordance with one embodiment of the present invention. Diagram 1600 shows boiler 502, bottom boiler 508, heat exchanger 1430, and bottom exchanger 1432, wherein boiler 502 and bottom boiler 508 are structured such that they can fit inside of heat exchanger 1430-1432.

In one aspect, HRP system includes a boiler, turbine, condenser, heat exchanger, and feed pump(s). The system operates under the principles of the regenerative cycle. The condenser exchanges heat with water in the boiler, and the heat exchanger acts to preheat incoming water, while cooling outbound processed and waste water. In an operation, water enters the boiler where it is heated past the critical point, and steam is generated. The turbine draws a vacuum in the boiler and forces the steam through a manifold and through the condenser. Since the boiling points of impurities normally found in water are higher than the boiling point of water, the water vapor is assumed to be pure as it flows through the turbine. The mechanism of injecting water into the boiler, in one example, promotes rotational flow within the main body, shaping the flow as it approaches the turbine.

Additionally, the configuration of the blades in the condenser is such that heat transfer back into the bulk media is at a maximum by optimizing the level of wetted surface area. The shape of the blades and their configuration also serves to smooth flow of steam through the boiler and into the turbine. The flow of purified water through the condenser splits into 1 of 2 intake manifolds, each one serving a respective bank of condenser blades. The manifolds feed into identical counter flow heat exchangers, which use incoming feed water as the cold working fluid, and exiting purified and exiting waste water as the hot working fluid. The use of symmetry is meant to promote optimal efficiency by precisely managing the thermal gradient within the control volume. The shape of the blades is aimed to correspond with the proposed water fill line. This entire system is wrapped by a skin of stainless steel, and the heat exchangers will be placed on either side of the condenser banks.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 17:
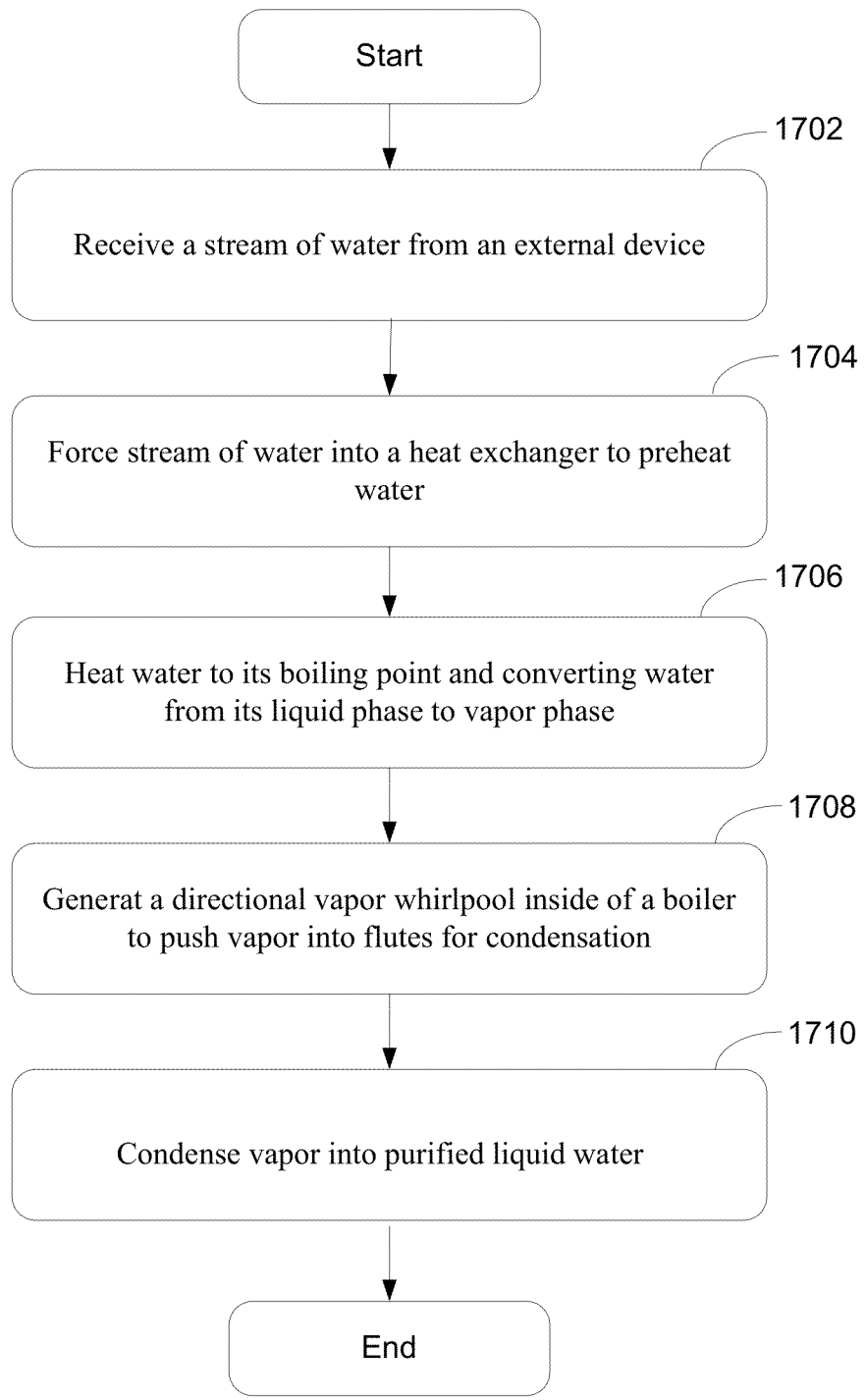
FIG. 17 is a flowchart illustrating a process of liquid purification using heat regenerative mechanism in accordance with one embodiment of the present invention.

FIG. 17 is a flowchart illustrating a process of liquid purification using heat regenerative mechanism in accordance with one embodiment of the present invention. At block 1702, a process capable of implementing regenerative heat exchange receives a stream of cold water from an external device, such as a municipal water supply company, river, well, pond, reservoir, or the like. Upon activating heat extracting pumps in response to water pressure provided by the stream of cold water, the process pushes or pumps purified water through the heat exchanger for transferring or extracting heat from purified water to the stream of cold water. The process also pushes or forces the discarded liquid such as waste water through the heat exchanger to extracting heat from the discarded liquid to preheat the stream of water.

At block 1704, when the stream of cold water enters the heat exchanger for preheating as the stream passes through the heat exchanger, water in the stream is heated to its boiling point when it reaches to the epic center. At block 1706, the stream of water is separated between purified water and waste water by converting a portion of water into vapor. At block 1708, a directional vapor whirlpool is generated inside of a boiler to push the vapor into a set of flutes for condensation.

At block 1710, the flutes or blades in the condenser condense vapor into purified water. The process forces the vapor through a set of angular shaped flutes capable of facilitating regenerating heat exchange between the angular shaped flutes. The purified water is subsequently pumped into the heat exchanger for heat extracting. The heat extracting or heat exchange occurs when hot pipes or tubes in the heat exchanger carrying hot purified water pass adjacent to cold pipes or tubes in the heat exchanger carrying the stream of cold water wherein the heat extracted from purified water preheats the incoming cold water. The hot waste water, on the other hand, is allowed to flow into the heat exchanger for heat extracting or heat reclaiming process. The heat reclaiming process occurs when hot pipes in the heat exchanger carrying the waste water pass adjacent to cold pipes in the heat exchanger carrying the stream of cold water. Upon activating heat extracting pumps in response to water pressure provided by the stream of water, the purified water is pushed through the heat exchanger for transferring heat from the purified water to the stream of water. The discarded liquid is also pumped through the heat exchanger for preheating the stream of water.

Electromagnetic Heater ("EMH")

An embodiment of the present application discloses a liquid processing system or HRP system which is able to purify liquid such as water using heating process. The heating or thermal process provides liquid with molecular phase changing from fluid to vapor. The HRP system, in one embodiment, includes a main boiler, a bottom boiler, and an electromagnetic heater ("EMH"), wherein the EMH includes a heating element, and a heating coil. The main boiler, in one example, is structured or shaped in a cylindrical shaped body capable of processing incoming liquid such as water for fluid purification. The bottom boiler holds at least a portion of incoming liquid for processing. While the heating element generates heat in response to a magnetic field, the heating coil, which is situated adjacent to the heating element, is able to generate the magnetic field needed in accordance with an electrical current.

Figure 18:
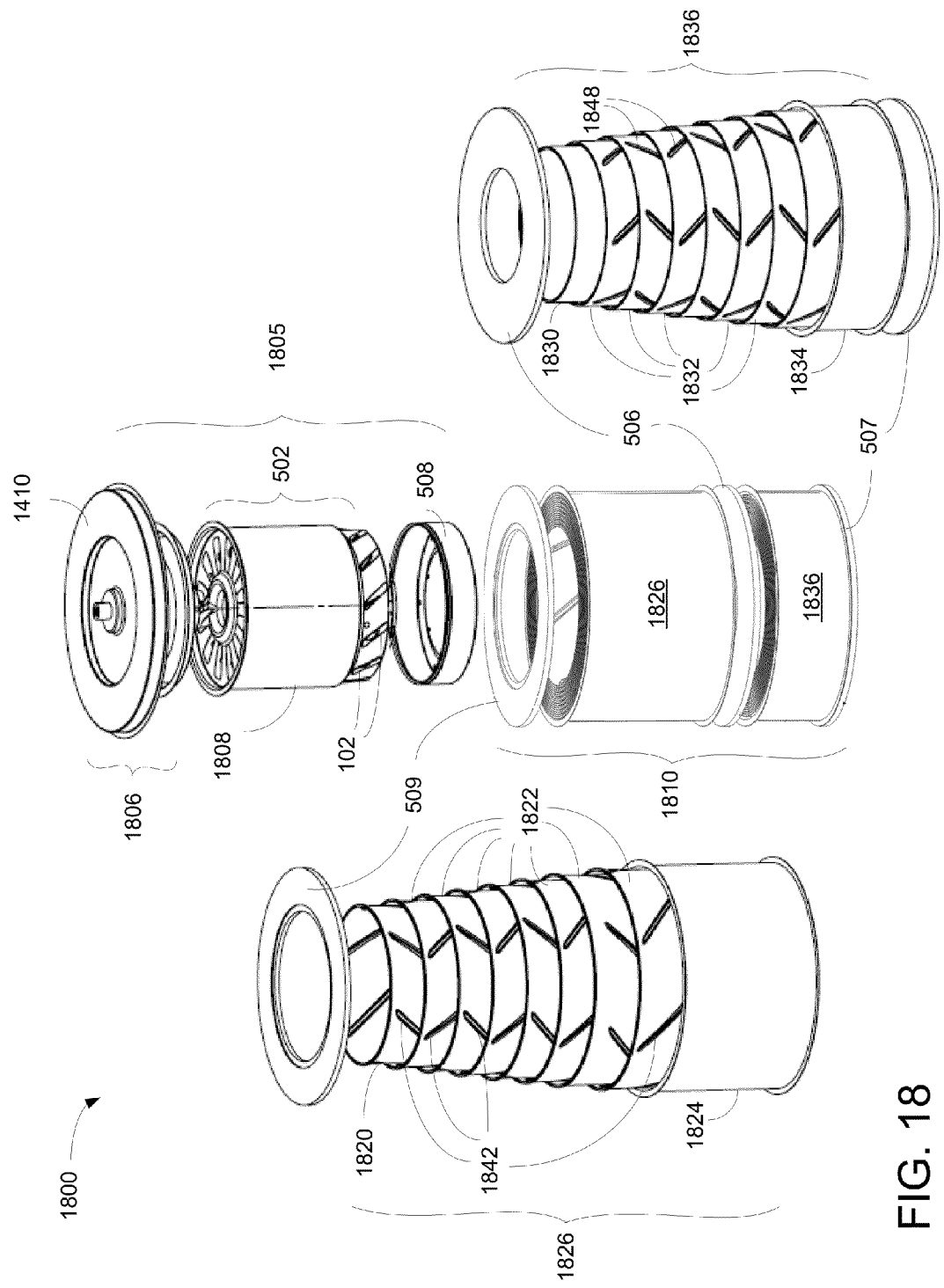
FIG. 18 illustrates a three-dimensional ("3D") view of a heat reclaim purification ("HRP") system using an electromagnetic heater ("EMH") and heat exchanger ("HE") to purify liquid in accordance with one embodiment of the present invention.

FIG. 18 illustrates a 3D view of a HRP system using EMH and HE to purify incoming liquid in accordance with one embodiment of the present invention. HRP system 1800 includes a boiler assembly 1805 and an HE 1810 wherein HE 1810 includes top HE 1826 and bottom HE 1836. Boiler assembly 1805 includes a turbine assembly 1806, a main boiler 502 and a liquid collecting panel or bottom boiler 508. It should be noted that the underlying concept of the exemplary embodiment(s) of the present invention would not change if one or more components (or devices) were added to or removed from system 1800.

Main boiler 502, in one aspect, is structured in a cylindrical shape 1808 configured to contain multiple blades or flutes which are used for liquid condensation. The low portion of main boiler 502 includes multiple output ports 102 which allow purified liquid such as purified water to enter top HE 1826 via bottom boiler 508. Bottom boiler 508, in one aspect, is structured in a cylindrical shape having a circular wall extending upward from the edge of bottom plate. The circular wall is configured to be able to couple to main boiler 502. Boiler assembly 1805, in one embodiment, includes an EMH, not shown in FIG. 18, wherein the EMH is able to heat surrounding liquid or water using an electromagnetic heating mechanism.

Top HE 1826, which is similar to HE 1430 shown in FIG. 14, includes multiple thermal conductive channels ("TCC") structured in multiple cylindrical shaped rings ("CSRs") 1820-1824. CSRs 1820-1824, in one embodiment, are formed with multiple nested concentric cylinders wherein CSR 1820 is the innermost cylinder while CSR 1824 is the outermost cylinder. Multiple cylinders 1822 are situated between CSR 1820 and CSR 1824 forming a multiple layered heat recovery or heat exchange device. CSR is made of thermal conductive materials, such as aluminum, metal, thermal conductive composite, and/or alloy, able to transmit heat between CSRs 1820-1824. Note that each CSR has a unique diameter whereby it can fit within neighboring CSRs to form an HE.

CSRs 1820-1824, in one embodiment, are configured to include hot TCC and cold TCC in an alternating arrangement. The alternating arrangement refers to hot TCC and cold TCC are structured in an alternate configuration whereby cold TCC can absorb heat from hot TCC. In one example, each cold TCC is situated adjacent to at least one hot TCC. In one aspect, most of cold TCC are switched by two hot TCC wherein the two hot TCC may facilitate passage of one or two hot liquid flows. Note that hot liquid flow can be purified water or waste water. Cold liquid flow can be tap water. Since HE 1826 is configured in the alternating arrangement, most of hot TCC are also switched by two cold TCC. For example, a flow of hot water travels ups and downs several times within the TCC to transfer its heat from hot water to cold water. Depending on the applications, the temperature of purified water at outlet port should be around room temperature since most of the heat carried by purified water is dissipated or transferred through TCC. The cold water or supply water, on the other hand, should be relatively warm or hot when the water reaches at boiler 502 ready for processing. Warm supply water is generated partially because cold water absorbs heat from hot water via TCC or CSRs.

Bottom HE 1836, which is similar to HE 1432 shown in FIG. 14, includes multiple TCC structured in CSRs 1830-1834. CSRs 1830-1834, in one embodiment, are formed by multiple nested concentric cylinders wherein CSR 1830 is the innermost cylinder while CSR 1834 is the outermost cylinder. Multiple cylinders 1832 are situated between CSR 1820 and CSR 1824. CSR can be made of thermal conductive materials, such as aluminum, metal, thermal conductive composite, and/or alloy, for transmitting heat across CSRs 1830-1834. Note that each CSR has a unique diameter whereby it can fit between neighboring CSRs in HE 1836.

CSRs 1830-1834, in one embodiment, are configured to include hot TCC and cold TCC in an alternating arrangement. The alternating arrangement of CSRs refers to each cold TCC is adjacent to at least one hot TCC. In some cases, a cold TCC is switched by two hot TCC wherein the two hot TCC may facilitate passage of one hot liquid flow such as waste water. For example, a flow of hot water travels ups and downs several times within the TCC in bottom HE 1836 to transfer its heat from the flow of hot water to a flow of cold water such as tap water or river water. Depending on the applications, when waste water exits HRP system, its temperature should be closer to room temperature by dissipating its heat through the TCC while the cold water or supply water should be fairly warm when it reaches to boiler 502 because it absorbs heat from hot waste and purified water via TCC.

During a purifying process, top HE 1826 reclaims or absorbs the heat from the processed liquid generated by boiler assembly 1805, while bottom HE 1836 reclaims the heat from waste liquid such as waste water generated b boiler assembly 1805 before it exits HRP system 1800. To reclaim or recover the heat, a cold liquid flow such as tap water or river water is used to extract heat from the processed or waste liquid before they leave HRP system 1800. The cold liquid flow, however, absorbs the heat from both top HE 1826 and bottom HE 1836 by traveling through HEs 1826 and 1836 before it reaches to boiler 502.

An advantage of using an HE is that it is able to reclaim the heat from processed liquid and waste liquid by transferring the heat to the cold unprocessed liquid.

HRP system 1800, which can also be referred to as a liquid processing system, is capable of recovering heat via a heat reclaiming device. System 1800 includes a top set of hot TCC, a bottom set of hot TCC, and a cold set of TCC. The top set of hot TCC, configured to be in top HE 1826 having a cylindrical shape, is configured to surround a main boiler or boiler 502. The top set of hot TCC is operable to guide a hot processed liquid flow such as purified water stream to flow through top HE 1826.

The bottom set of TCC, configured to be in bottom HE 1836 having a cylindrical shape, is operable to guide a waste liquid flow such as waste water stream to flow through bottom HE 1836. A manifold or central manifold 506 is situated between top HE 1826 and bottom HE 1836. In one aspect, central manifold 506 is used to separate between the purified liquid flow and waste liquid flow while allowing cold liquid flow to pass through.

The cold set of TCC is thermally coupled to the top set of TCC and bottom set of TCC for guide a cold liquid flow to flow through both top HE 1826 and bottom HE 1836. For example, the cold liquid flow flows through the cold set of TCC adjacent to the top set of TCC and extracts heat from the hot processed liquid flow via the top set of TCC and the cold set of TCC. Center manifold 506 allows the cold liquid flow to travel from one side of center manifold 506 to another side allowing the cold liquid flow to absorb heat from hot waste liquid flow as well as hot purified liquid flow.

The top set of TCC, in one embodiment, includes multiple top concentric cylinders or CSRs 1820-1824 which are configured to form top HE 1826. Top HE 1826, in one example, accumulates heat from processed or heated liquid generated by main boiler 502. Each of top concentric cylinders has a unique diameter so that every top concentric cylinder can fit in one or two neighboring cylinders. Note that top HE uses various concentric cylinders or CSRs 1820-1824 to form a hollow column. While CSR 1820 adjacent to boiler 502 has the smallest CSR diameter, CSR 1824 situated at the outmost of top HE 1826 has the largest diameter.

In one embodiment, top HE 1826 includes a hot conduit and a cold conduit wherein the conduits include guide ridges 1842 for guiding liquid flows. In an alternative embodiment, top HE 1826 includes multiple sets of hot conduits and cold conduits. The hot conduit, in one example, includes the top set of TCC and the cold conduit includes a portion of the cold set of TCC. The cold liquid flow, for example, can travel through the cold conduit absorbing heat transmitted from a hot liquid flow via the hot conduit. It should be noted that the cold liquid flow can be room temperature or ambient temperature of water stream, while the hot liquid flow such as purified water stream can be close to liquid boiling temperature.

Bottom HE 1836 includes CSRs 1830-1834 containing bottom set of TCC. Each of bottom CSRs 1830-1834 has a unique diameter allowing a larger bottom concentric cylinder to house or enclose a smaller bottom CSR whereby all CSRs 1830-1834 collapse into a single column configuration. Bottom HE 1836 includes at least one hot conduit and one cold conduit wherein the conduits, in one example, include guide ridges 1848 for guiding the flow(s). The cold conduit, in one example, includes a portion of cold set of TCC able to facilitate heat transfer between the hot conduit and the cold conduit. Note that bottom HE 1836 may include multiple sets of hot and cold TCC. It should be noted that top HE 1826 and bottom HE 1836 include guiding mechanism configured to direct and/or pump liquid flows in predefined directions. A benefit of employing HE 1810 in HRP system 300 is that HE 1810 guides processed or purified hot liquid flow(s) to travel through thermally conductive pipes multiple times to recover heat from the hot liquid flows. The recovered heat is stored in the incoming cold liquid flow.

An advantage of using EMH in the HRP system is that EMH is energy efficient as well as easy to maintain since its heating surface which is in contact with the liquid is a separate unit from the heating source which connects to an electrical power source.

FIG. 19 is a 3D diagram 1900 illustrating an exemplary detail of boiler assembly 1805 of HRP system including EMH 1902 in accordance with one embodiment of the present invention. The HRP system, also known as liquid processing system, is able to purify liquid such as water by first vaporizing the liquid with heat, and second re-condensing vapor back to liquid by a condensation process. The process of vaporizing-condensing process also discards or releases the waste liquid or heavy liquid with impurities from the HRP system. It should be noted that the underlying concept of the exemplary embodiment(s) of the present invention would not change if one or more components (or devices) were added to or removed from diagram 1900.

Boiler assembly 1805 includes cover 1410, turbine 1402, condenser input ports 101, main boiler 502, and bottom boiler 508. Turbine 1402 is anchored inside of cover 1410 and facing inside of main boiler 502. A function of turbine 1402 is to create localized differential pressures and/or vacuum(s) whereby vapor can be pushed or guided through input ports 101 for condensation. After entering input ports 101, vapor condenses into liquid as processed or purified liquid, such as drinkable water. The purified liquid subsequently exits main boiler 502 through output ports 102.

Main boiler 502, in one aspect, is fabricated as a cylindrical shaped structure or container configured to house various blades or flutes. A function of blade or flute is to condense vapor into purified liquid. Note that the contour or shape of blades is so configured such that it facilitates liquid condensation from vapor molecular to liquid molecular. A function of main boiler 502 is to separate purified liquid or purified from incoming liquid. The HRP system is able to extract heat from the waster liquid or liquid with the impurities before discarding the waste water.

Bottom boiler 508, also known as a liquid collecting pan or collecting panel, is configured to couple to main boiler 502 and is able to receive or accept incoming liquid. The incoming liquid such as tap water, in one example, is preheated processing liquid. Bottom boiler 508, in one embodiment, channels both purified liquid (or processed liquid) and waste liquid to HEs for heat recycling. Bottom boiler 508, in one embodiment, is a shallow, wide, open container including a circular wall 1910 extending from the edge of circular bottom plate 1912. Bottom plate 1912 includes a first or inside surface and a second or outside surface. The first or inside surface 1916 of bottom plate 1912 is facing inside of main boiler 502 as indicated by arrow 1920 while the second or outside surface 1918 of bottom plate 1912 is located outside of main boiler 502 as indicated by arrow 1922. In one example, bottom boiler 508 is able to hold a portion of processing liquid for heating during the liquid purification processing.

EMH 1902, which can also be referred to as heating mechanism, heat source, magnetic resonance heating device, induction burner, induction heating system, et cetera, includes heating element 1906 and heating coil 1908. Heating element 1906, in one embodiment, is coupled to inside surface 1916 of bottom plate 1912 and generates heat in response to a magnetic field 1926-1928. Heating coil 1908, in one embodiment, is placed adjacent to heating element 1906 and situated outside of surface 1918 of bottom boiler 508. Heating coil 1908 emits magnetic field 1926-1928 in response to an electrical current flowing through an electric conductive wire (s) of heating coil 1908. Magnetic field 1926-1928 generated by heating coil 1908 penetrates bottom plate 1912 and magnetically couple to heating element 1906. A local current flow(s) is created in heating element 1906 when it is coupled to magnetic field 1926-1928, and temperature of heating element 1906 begins to rise as the local current continues flowing through heating element 1906.

It should be noted that the electrical current flowing through the coils or wires of heating coil 1908 induces a magnetic field such as magnetic field 1926-1928 that travels through bottom plate 1912 of bottom boiler 508 or the boiler manifold to heating element 1906. The coupling between magnetic field 1926-1928 and heating element 1906 produces necessary heat to transform liquid molecular to vapor molecular. In one example, EMH 1902 or heating system is based on transition of magnetic field that creates Eddy current by modulated power which generates the surface heat of heating element 1906. In one aspect, multiple heating coils can be used to enhance the efficiency of heating generation. For example, a range of one (1) to twelve (12) individual heating coils may be used to energize simultaneously with current flowing alternatively from coil to coil transition.

Electromagnetic induction generally can be referred to as generating electric current in a closed circuit by fluctuation of current in a second circuit situated adjacent to the closed circuit. For instance, the induction heating essentially allows an AC current to flow through a primary circuit which subsequently generates magnetic movement or field that affects a secondary circuit(s) located in the vicinity of the primary circuit. The fluctuation of current flowing in the primary circuit generates a secondary current in the neighboring secondary circuit. Depending on the applications, the secondary current can be used for heat generation.

Heating element 1906 may be made of ferromagnetic material such as certain types of stainless steel. When the ferromagnetic material is disposed in an alternating magnetic field, an alternating electric ("AC") current induces near the surface of the ferromagnetic material. The flow of induced current in heating element 1906 generates sufficient heat for purification process. The amount of heat generated is a function of induced current versus physical properties of ferromagnetic material(s) used. Note that the properties of the ferromagnetic material and the flux strength of magnetic field can influence the amount of heat generated by heating element 1906.

Heating coil 1908 is an electric conducting coil, wire, and/or cable. When charged with electric current, heating coil 1908 generates a magnetic field such as magnetic field 1926-1928 approximately perpendicular to the direction of current flow. When heating element 1906 is placed within the area of magnetic field 1926-1928, heating element 1906 and heating coil 1908 are magnetically coupled. When heating element 1906 is magnetically coupled to heating coil 1908, flow of current in heating coil 1908 induces a current (Eddy current or inductive current) in heating element 1906 which begins to heat surrounding liquid by the surface temperature of heating element 1906. It should be noted that heating coil 1908 can be structured in different shapes other than the structure illustrated in FIG. 19. For example, heating coil 1908 may be structured in a compact flat-disk configuration. Alternatively, heating coil 1908 include multiple coils configured in a stacked flat-disk configuration.

During an operation, heating element 1906 is in contact, submerged, and/or surrounded by processing liquid or water in bottom boiler 508 or main boiler 502 while heating coil 1908 is located in a relatively dry environment external to main boiler 502 as shown in FIG. 19. Liquid to be purified is preheated while traveling through HE(s) and enters boiler assembly 1805 through incoming liquid openings in bottom boiler 508. The molecular of incoming liquid changes to vapor when the incoming liquid passes through the vicinity of heating element 1906.

FIGS. 20A-B are 3D diagrams 2000-2001 illustrating different views of EMH used in the HRP system in accordance with one embodiment of the present invention. Diagram 2000 illustrates a top-front 3D view of EMH having heating element 1906 and heating coil 1908. Heating element 1906 is coupled to heating coil 1908 by magnetic field 2030 through the bottom plate of bottom boiler. Alternatively, Heating element 1906 and heating coil 1908 are placed next to each other without any plates or panels between them. It should be noted that the underlying concept of the exemplary embodiment(s) of the present invention would not change if one or more components (or devices) were added to or removed from diagram 2000 or 2001.

Heating element 1906, in one example, is structured to include a heating base 2010 and multiple spiral twisted heating ridges ("STHRs") 2016 rising from the edge of heating base 2010 toward center portion 2012 of heating base 2010. Heating element 1906 is formed with a spiral twisted cone shape with multiple STHRs 2016 wherein between every two STHRs 2016 form a flow channel 2002. A function of using STHRs 2016 and flow channels 2002 is to increase heating surface of heating element 1906 whereby the liquid surrounding heating element 1906 will reach its boiling or vaporizing point quickly. Another function of using STURs 2016 is that angled spiral twisted ridges assist to generate a spiral vapor convection flow. It should be noted that a convective flow is fluid or liquid motion due to differences in its mass density. Note that different densities can occur due to temperature differences and/or gradients.

Heating element 1906, in one example, is placed adjacent to a first surface of bottom plate of the bottom boiler wherein the first surface of bottom plate faces inside of the main boiler. Heating coil 1908, in one embodiment, is placed adjacent to a second surface of bottom plate of the bottom boiler wherein the second surface of bottom plate is situated outside of the main boiler. While heating element 1906 may be semi-submerged in the processing liquid, heating coil 1908 which couples to electrical power is operating in a relative dry environment outside of the main boiler. Since heating coil 1908 is responsible to generate magnetic field 2030 in response to the connected power source, it is advantageous to locate heating coil 1908 in a dry environment.

Diagram 2001, which is similar to diagram 2000, illustrates a bottom-up 3D view of EMH having heating element 1906 and heating coil 1908. In one example, heating coil 1908 includes a pair of electrical connectors or terminals 2006 configured to couple heating coil 1908 to an electric based power source, such as power from local utility company, solar power unit, battery power, and/or a combination of AC, DC, and solar powers. A frame 2022 is used to support or anchor heating coil 1908 to a structure or plane such as the outside surface of the bottom plate of bottom boiler.

STHRs 2016 include edge surfaces 2008 gradually rising from the edge of top surface of base 2010 toward the middle of base 2010 wherein the highest point of each STHR 2016 is around center portion 2012. It should be noted that different types of configuration can be used to construct or build heating element. For example, depending on the applications, heating element can be just a flat plate or disc without any ridges. In one aspect, the number of STHRs 2016 matches with the number of the flutes in the condenser.

Each STHR 2016 includes an edge surface 2008 which is shaped to a contour of blade or flute. From the highest points around center portion 2012, edge surface 2008 slopes down to the perimeter or the edge of base 2010 with curved shapes closely resembles to contour of flute. Flow channel 2002 is created between every two adjacent STHRs 2016 around base 2010. A function of flow channels 2010 is to provide additional heating surface for liquid heating.

Heating element 1906, in one embodiment, further includes a central duct 2018 located at the center of base 2010. Central duct 2018 is a liquid passage through which the preheated liquid enters the boiler while being further heated by heating element 1906. Central duct 2018 has an inlet 2020 opened through base 2010. The surface feature of heating element 1906 facilitates creation of swirl flow vapor pattern after incoming liquid contacts heating element 1906.

Base 2010 includes multiple inlet channels or conduits 2014 at the bottom of base 2010. When heating element 1906 is coupled to the inside surface of bottom boiler, multiple inlet channels 2014 are formed. Inlet channels 2014, in one aspect, facilitate passages of fluid between central duct 2018 and preheated liquid entering the boiler.

Heating coil or electric coil 1908 is made of an electric conductive wire formed in a loop arranged in a concentric circular configuration. Contact terminals 2006, in one example, are ends of the electric conductive wire for connecting to an electrical power source. The diameter of conduction wire and the number of loops of heating coil 1908 may depend on the applications and requirements. When an alternating current is applied, the heating coil 1908 generates a magnetic field such as field 2030.

To heat the liquid efficiently and uniformly, EMH, in one example, creates a swirling circulation vapor flow or convection flow in accordance with the liquid being heated. The convection flow may be generated by, for instance, heating alternating flow channels 2002 in heating element 1906. It should be noted that an uneven heating between flow channels 2002, for example, can create temperature gradient whereby renders molecular density difference. Consequently, a convection flow of liquid may be generated. The convection flow, in one example, follows envelope of STHRs 2016 and generates a vapor flow having a whirlpool pattern circulating inside the boiler.

Figure 21A:
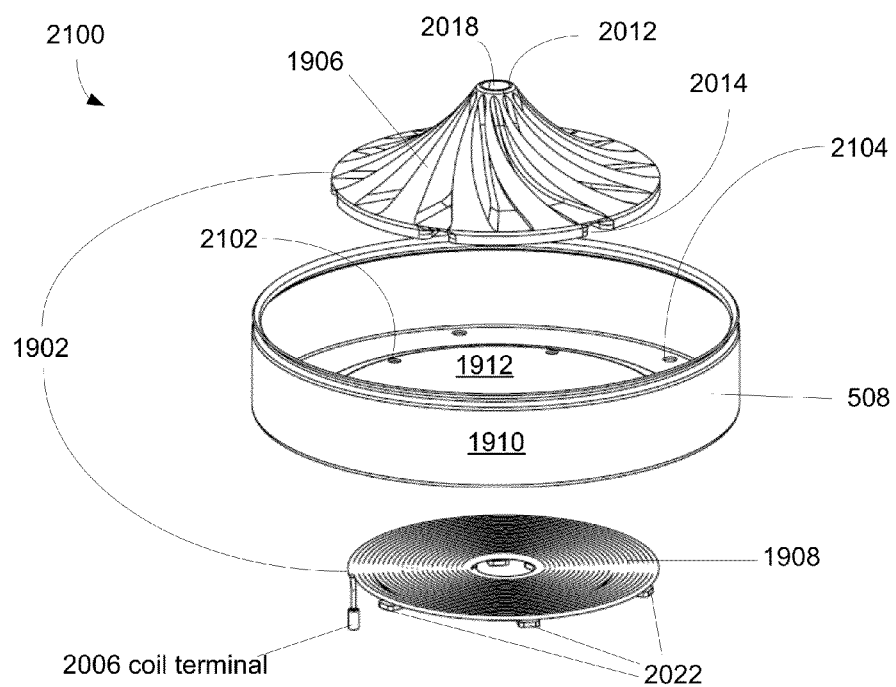
FIGS. 21A-B are diagrams illustrating different views of bottom boiler and EMH in accordance with one embodiment of the present invention.
Figure 21B:
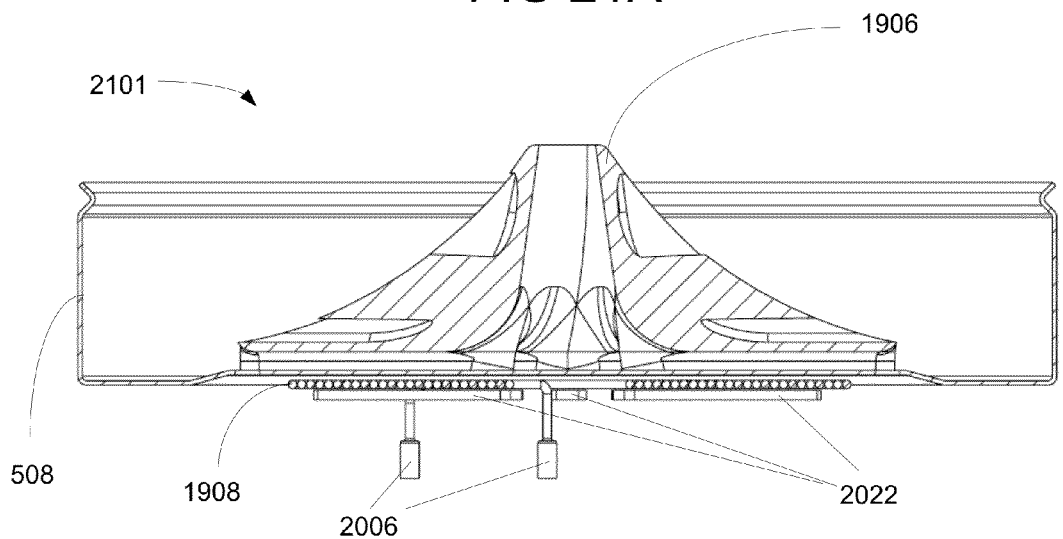

FIGS. 21A-B are diagrams 2100-2101 illustrating different views of bottom boiler 508 and EMH in accordance with one embodiment of the present invention. Diagram 2100, which is similar to diagram 1900 shown in FIG. 19, is a 3D diagram illustrating EMH 1902 and bottom boiler 508. Bottom boiler 508 includes wall 1910, bottom plate 1912, liquid inlet ports 2102, and liquid draining outlets 2104. Inlet ports 1202, in one embodiment, are used to receive processing or incoming liquid such as incoming water. Draining outlets 2104, on the other hand, are used to drain waste or excessive liquid such as waste water from the boiler.

Heating element 1906, in one embodiment, is installed to bottom boiler 508 facing toward inside of boiler. When preheated liquid such as water enters inlet port 2102 and flows through vent 2018, the molecular density of liquid begins to change as its temperature rises in response to heating surface of heating element 1906. In one aspect, liquid inlet ports 2102 and drain outlets 2104 control the liquid level inside the boiler. The flow rate of liquid through inlet ports 2102 as well as drain speed of waste liquid at drain outlets 2104 can be adjusted and/or controlled to maintain a steady-state of liquid level in the boiler.

Diagram 2101, which shows similar components in diagram 2100, is a side-view of bottom boiler 508 containing EMH 1902. While heating element 1906 is seated inside of bottom boiler 508, heating coil 1908 is attached to bottom or outside of bottom boiler 508. Although inside of bottom boiler 508 is relatively wet, the anchoring place for heating coil 1908 is relatively dry. Contact terminals 2006 are able to connect external alternating current ("AC") power supply such as 110 to 220 Volts with high frequency such as 440 KHz. EMH or any suitable heat source 1902, which can be powered by electricity, solar, wind power, gasoline, or mechanical manual power generator, is coupled with heat element 1906 for converting water molecules from liquid formation to vapor formation. It should be noted that HRP system may include additional electronic components at bottom boiler 508.

Figure 22:
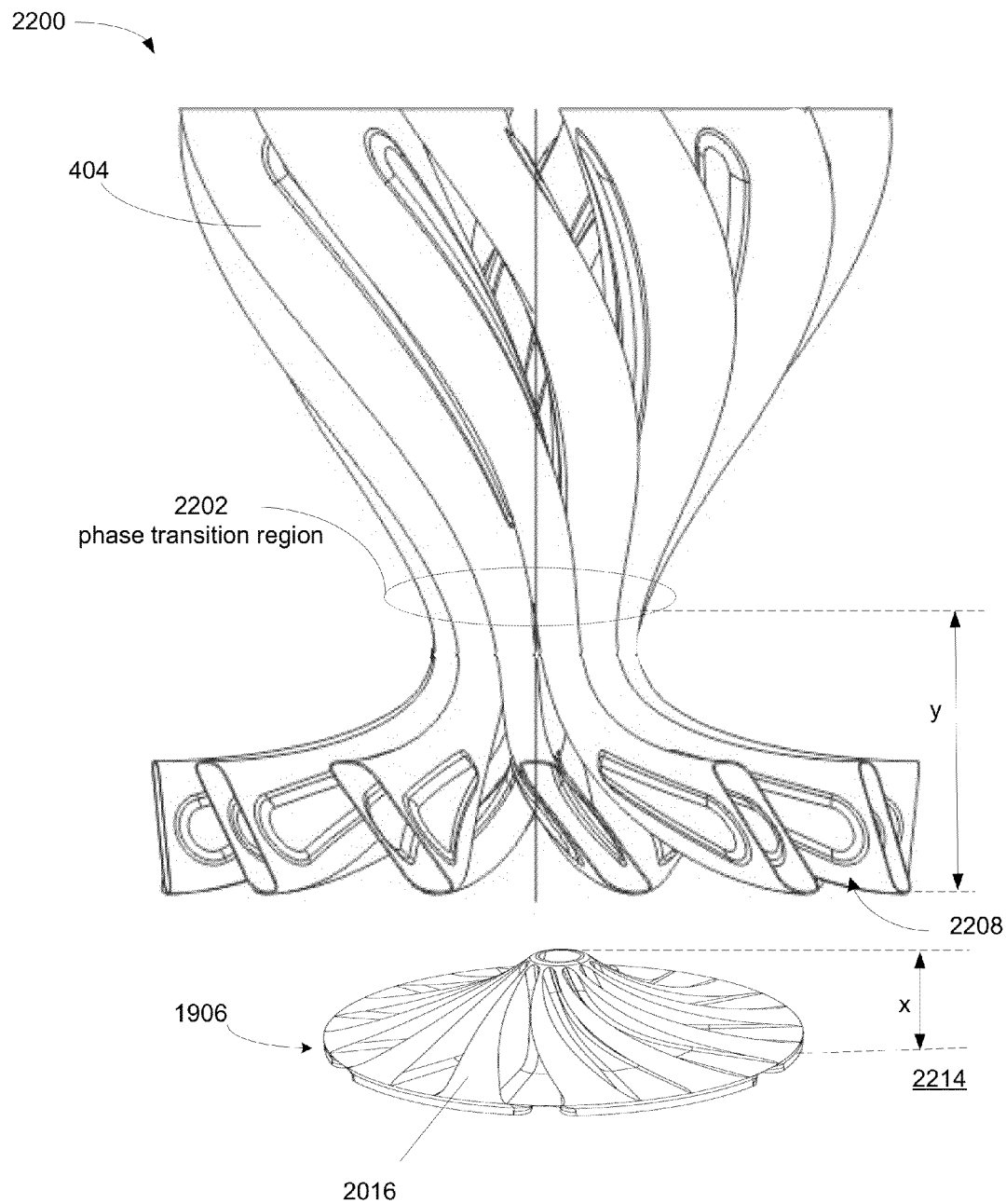
FIG. 22 is a diagram illustrating an exemplary assembly of condenser together with a heating element in accordance with one embodiment of the present invention.

FIG. 22 is a diagram 2200 illustrating an exemplary assembly of condenser together with heating element 1906 in accordance with one embodiment of the present invention. Diagram 2200, similar to diagram 1202 shown in FIG. 12, includes a condenser and heating element 1906, wherein heating element 1906 is positioned relative to configuration of bottom part of condenser. The condenser, in one example, includes twelve (12) blades 404 wherein each blade 404 has an aerodynamic body contour 2208. Depending on the applications, the size and surface shape of heating element 1906 may be adjusted accordingly to optimize the efficiency of liquid purifying processing.

The size and surface shape of heating element 1906, in one embodiment, is configured to have a dimension that will fit inside of blades 404 without physically in contact with blades 404. Alternatively, heating element 1906 is configured to have the same number of STHRs as the number of blades 404, and each STHR twists or curves at the same angle or degree as each blade 404 curves. When heating element 1906 is fitted or installed with the condenser, the edge surfaces of STHRs contact with the bottom part of blades 404. The design and height y of blades 404 may be changed based on the type of liquid to be purified. Since the physical properties of different liquids contain different molecular structures with different boiling points, phase transition regions 2202 for blades 404 may have to be adjusted accordingly in accordance with the vaporization point. As such, to optimize device efficiency, height x of heating element 1906 will also need to be adjusted in response to height y of blades 404.

Figure 23:
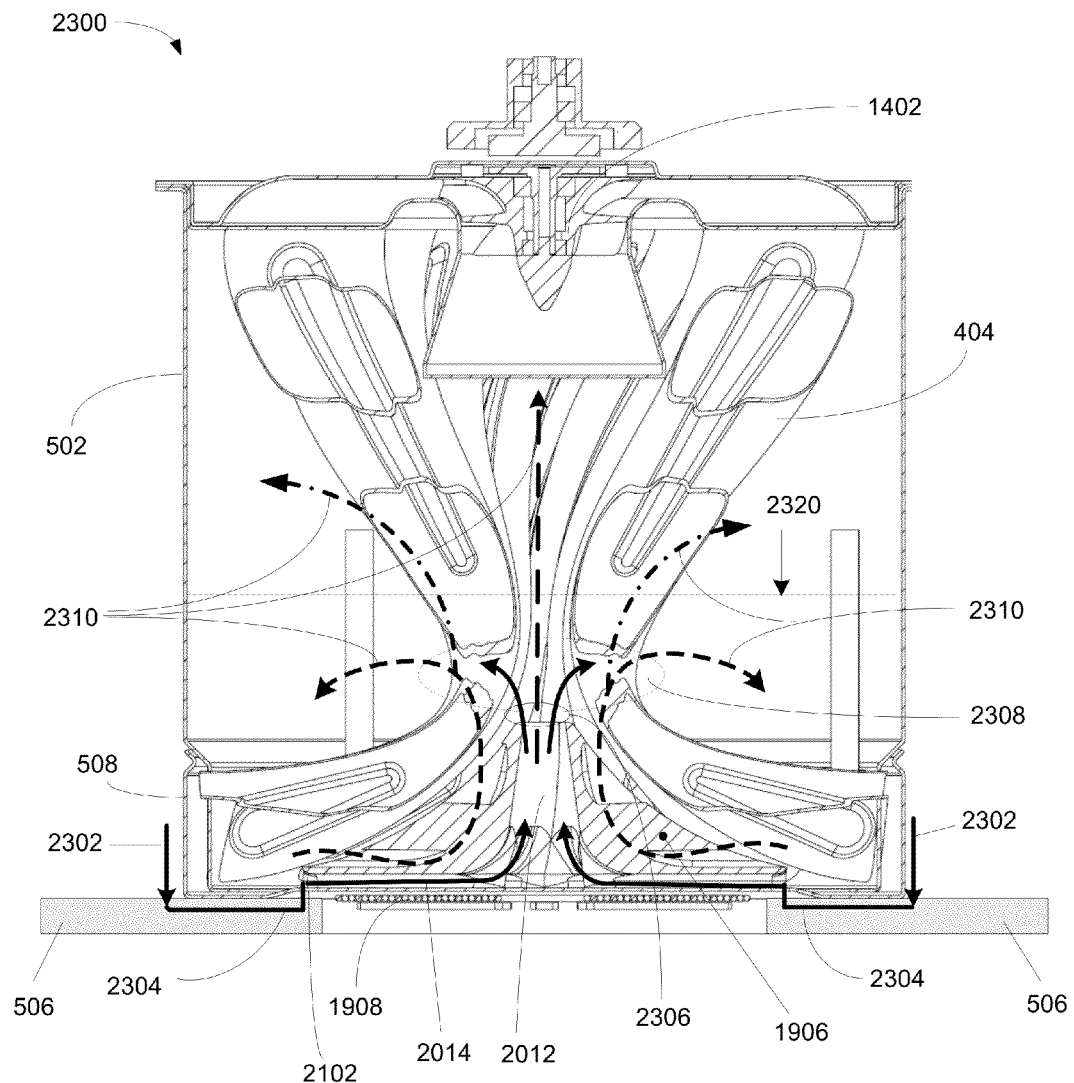
FIG. 23 is a cross-section side-view diagram illustrating a portion of HRP system using an electromagnetic heater in accordance with one embodiment of the present invention.

FIG. 23 is a cross-section side-view diagram 2300 illustrating a portion of HRP system using an EMH in accordance with one embodiment of the present invention. Diagram 2300, which is similar to diagram 1400 shown in FIG. 14, includes main boiler 502, bottom boiler 508, center-manifold 506, and EMH. The EMH, in one embodiment, includes heating element 1906, and heating coil 1908, wherein heating element 1906 is anchored inside of the boiler while heating coil 1908 is located outside of the boiler. It should be noted that the underlying concept of the exemplary embodiment(s) of the present invention would not change if one or more components (or devices) were added to or removed from diagram 2300.

During an operation, when preheated or incoming liquid 2302 enters center manifold 506, incoming liquid 2302 passes through channel 2304 and reaches bottom boiler 508 through one or more inlet ports 2102. Upon activating heating element 1906, incoming liquid 2304 begins entering in area surrounding heating element 1906 via openings 2314 and central duct 2012. When incoming liquid 2302 moves through central duct 2012, at least a portion of incoming liquid 2302 is vaporized becoming vapor 2310 exiting central duct 2012 as indicated by numeral 2306. Depending on the applications, the liquid molecular exiting central duct 2012 can be a mixture of vapor and fluid as indicated by numeral 2306. Incoming liquid 2302 that flows out of central duct 2012 and/or flows to bottom boiler 508 continues to be heated until portion(s) of liquid 2302 vaporized. It should be noted that liquid 2302 exits from the vent is at least partially vaporized as indicated by arrows 3206. The remaining liquid 2302, which may include waste liquid, is held by bottom boiler 508 for continuing purification process. It should be noted that area 2308 should be one of the hottest locations in boiler 502.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 24:
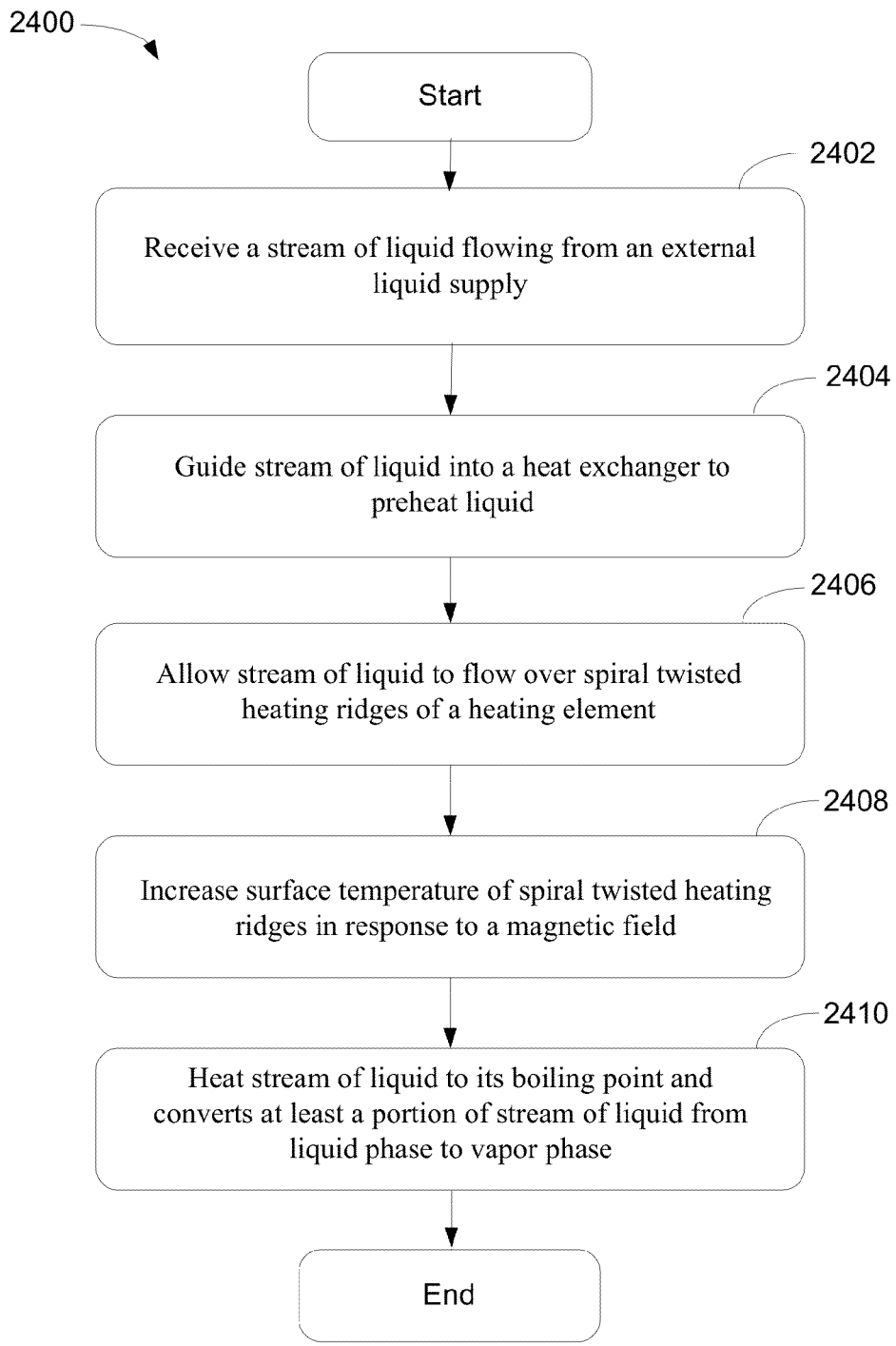
FIG. 24 is a flowchart illustrating a process of liquid purification using electromagnetic heating in accordance with one embodiment of the present invention.

FIG. 24 is a flowchart 2300 illustrating a process of liquid purification using EMH in accordance with one embodiment of the present invention. At block 2402, a method of liquid purification receives a stream of liquid flowing from an external liquid supply. Note that the stream of liquid is similar to income liquid. For example, the stream of liquid can be a stream of water flowing from an external water supply such as a utility company.

At block 2404, the process is able to guide the stream of liquid into an HE(s) for preheating as the stream of liquid passes through the HE and absorbs recycled heat. Note that during the passage of HE, the stream of liquid recovers a portion of heat from the processed liquid and/or waste liquid.

At block 2406, the stream of liquid is allowed to flow over multiple STHEs of a heating element when the stream of liquid enters the bottom boiler via at least one liquid inlet port. In one aspect, the process is capable of allowing the surface of the STHEs to be in contact with incoming or processing liquid or water for heating.

At block 2408, the surface temperature of the STHEs rises in response to a magnetic field. In one embodiment, the process applies a differential potential to a heating coil. Upon flowing of a current in the heating coil, a magnetic field is created. The magnetic field is used to couple to the heating element for heat generation.

At block 2410, the stream of liquid is heated to its boiling point and subsequently, at least a portion of the stream of liquid is converted from liquid phase to vapor phase. In one aspect, the process is able to generate a directional vapor whirlpool guided by the STHEs that rises from the heating element toward up portion of the main boiler. The vapor flow may be redirected in response to localized pressure variations created by the compressor. The vapor is subsequently condensed inside of blades and releases heat during the transition from vapor phase to liquid phase.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A liquid processing system able to vaporize liquid with heat, comprising:
   a main boiler having a cylindrical shape configured to separate a stream of purified liquid from a stream of input liquid;
   a bottom boiler coupled to bottom portion of the main boiler and configured to exchange heat between the purified liquid and the input liquid;
   a heating element coupled to the bottom boiler and configured to generate heat in response to a magnetic field; and
   a heating coil situated adjacent to the heating element and able to generate the magnetic field in accordance with an electrical current.

2. The system of claim 1, wherein the main boiler further includes a plurality of blades configured to facilitate a process of liquid condensation from vapor to liquid.

3. The system of claim 2, wherein the main boiler facilitates generating drinkable water from tap water.

4. The system of claim 1, wherein the bottom boiler is a liquid collecting panel able to channel a stream of purified liquid to a heat exchange before exiting as the purified liquid.

5. The system of claim 4, wherein the bottom boiler is a liquid collecting panel able to channel a stream of waste liquid containing impurities to a bottom heat exchange before exiting as a stream of discarded liquid.

6. The system of claim 1, wherein the heating element is structured to include a heating base and a plurality of spiral twisted heating ridges rising from edge of the heating base toward center portion of the heating base.

7. The system of claim 6, wherein the heating element has a spiral twisted cone shape with the plurality of spiral twisted heating ridges to increase heating surface of the heating element.

8. The system of claim 7, wherein the plurality of spiral twisted heating ridges is able to generate a spiral convection flow when temperature of the liquid is raised in response to temperature of the plurality of spiral twisted heating ridge.

9. The system of claim 6, wherein the heating element is situated adjacent to a first surface of a bottom plate of the bottom boiler, wherein the first surface of bottom plate faces inside of the main boiler.

10. The system of claim 8, wherein the heating coil is situated adjacent to a second surface of bottom plate of the bottom boiler, wherein the second surface of bottom plate is situated outside of the main boiler.

11. An apparatus having a main boiler, a bottom boiler, an electromagnetic heater for liquid purification, the apparatus comprising:
    a heat exchanger, having a cylindrical shape, receiving a stream of liquid flowing from an external liquid supply;

a set of heat exchange pipes in the heat exchanger guiding the stream of liquid to pass through the heat exchanger to preheat the stream of liquid;

a plurality of spiral twisted heating ridges on a surface of a truncated cone shaped heating element coupled to the heat exchanger and configured to allow the stream of liquid to flow over at least a portion of surface of the spiral twisted heating ridges; and a heating coil situated adjacent to the heating element and able to provide a magnetic field for increasing surface temperature of the plurality of spiral twisted heating ridges in response to the magnetic field and converting at least a portion of the stream of liquid from liquid phase to vapor phase.

12. The apparatus of claim 11, wherein the spiral twisted heating ridges of heating element is capable of generating a directional vapor whirlpool guided by the plurality of spiral twisted heating ridges rising from the heating element toward top portion of the main boiler.

13. The apparatus of claim 12, further comprising a compressor capable of redirecting vapor flow in response to localized pressure variations created to condense the vapor into purified liquid via a plurality of blades.

14. The apparatus of claim 11, wherein a heat exchanger receiving a stream of liquid flowing from an external liquid supply includes an inlet port of the heat exchanger coupled to an external water supply.

* * * * *